(12) United States Patent
Aoki et al.

(10) Patent No.: US 9,963,149 B2
(45) Date of Patent: May 8, 2018

(54) VEHICLE CONTROL DEVICE

(71) Applicant: TOYOTA JIDOSHA KABUSHIKI KAISHA, Toyota-shi, Aichi-ken (JP)

(72) Inventors: Kenichiro Aoki, Miyoshi (JP); Ryuta Hashimoto, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days. days.

(21) Appl. No.: 15/423,795

(22) Filed: Feb. 3, 2017

(65) Prior Publication Data

US 2017/0240176 A1    Aug. 24, 2017

(30) Foreign Application Priority Data

Feb. 24, 2016   (JP) .................................. 2016-033168

(51) Int. Cl.
*B60W 30/18*   (2012.01)
*G08G 1/16*   (2006.01)
*B60W 40/04*   (2006.01)

(52) U.S. Cl.
CPC ...... *B60W 30/18163* (2013.01); *B60W 40/04* (2013.01); *G08G 1/167* (2013.01); *B60W 2550/30* (2013.01)

(58) Field of Classification Search
CPC . B60W 30/18163; B60W 40/04; G08G 1/167
See application file for complete search history.

(56) References Cited

U.S. PATENT DOCUMENTS 8,666,599 B2 *   3/2014   Otuka ................... G08G 1/167
                                                     701/41

FOREIGN PATENT DOCUMENTS

JP         2011-213295 A      10/2011

* cited by examiner

*Primary Examiner* — Todd Melton
(74) *Attorney, Agent, or Firm* — Sughrue Mion, PLLC

(57) ABSTRACT

A passing restraint flag for restraining a host vehicle from passing a preceding vehicle ahead is established by a passing restraint determination unit of the vehicle control device. In addition, when the passing restraint flag is established, a traveling plan for the host vehicle not to pass the preceding vehicle ahead is generated by a traveling plan generation unit of the vehicle control device. The passing restraint determination unit establishes the passing restraint flag when there is the possibility of an inappropriate operation of passing occurring such as when a distance between a merging point of a traveling lane along which the host vehicle travels and a merging lane merging into the traveling lane, and a position of the preceding vehicle having passed through the merging point is equal to or less than a third threshold.

4 Claims, 26 Drawing Sheets

VEHICLE CONTROL DEVICE

TECHNICAL FIELD

The present invention relates to a vehicle control device.

BACKGROUND

Hitherto, as disclosed in Japanese Unexamined Patent Publication No. 2011-213295, a device that restrains unreasonable passing of a host vehicle when a relative speed between a preceding vehicle and the host vehicle during the host vehicle coming close to the preceding vehicle is small, is known.

When the relative speed is smaller than a predetermined value, the device disclosed in Japanese Unexamined Patent Publication No. 2011-213295 adjusts the speed of the host vehicle so as to conform to the speed of the preceding vehicle. In addition, when the relative speed is equal to or greater than a predetermined value, and it is predicted that a following vehicle traveling at the rear of the host vehicle before the host vehicle completes passing of the preceding vehicle catches up with the host vehicle, the device disclosed in Japanese Unexamined Patent Publication No. 2011-213295 adjusts the speed of the host vehicle so as to conform to the speed of the preceding vehicle.

SUMMARY

Incidentally, when it is determined whether the host vehicle passes the preceding vehicle ahead on the basis of the relative speed, the relative speed decreases after an operation of passing is started, for example, due to the acceleration of the preceding vehicle, the deceleration of the host vehicle, or the like, and thus the operation of passing may become inappropriate. When the operation of passing is stopped due to a decrease in relative speed, an operation such as a lane change and acceleration for passing may come to nothing. In addition, when the operation of passing is performed during a decrease in relative speed, it may take a longer period of time for the host vehicle to pass the preceding vehicle ahead than normal.

Consequently, an object of the present invention is to provide a vehicle control device capable of reducing the occurrence of an inappropriate operation of passing.

According to an aspect of the present invention, there is provided a vehicle control device including: a preceding vehicle recognition unit configured to recognize a preceding vehicle traveling in front of a host vehicle; a road information acquisition unit configured to acquire road information relating to a traveling lane along which the host vehicle and the preceding vehicle travel; a passing request determination unit configured to establish a passing request flag for requesting that the host vehicle pass the preceding vehicle ahead, when an inter-vehicle distance between the preceding vehicle recognized by the preceding vehicle recognition unit and the host vehicle is equal to or less than a first threshold, and a relative speed between the preceding vehicle and the host vehicle when the host vehicle comes close to the preceding vehicle recognized by the preceding vehicle recognition unit is equal to or greater than a second threshold; a passing restraint determination unit configured to establish a passing restraint flag for restraining the host vehicle from passing the preceding vehicle ahead, on the basis of any of a state of the preceding vehicle recognized by the preceding vehicle recognition unit and the road information acquired by the road information acquisition unit; a traveling plan generation unit configured to generate a traveling plan of the host vehicle on the basis of the state of the preceding vehicle recognized by the preceding vehicle recognition unit, the road information acquired by the road information acquisition unit, the passing request flag established by the passing request determination unit, and the passing restraint flag established by the passing restraint determination unit; and a traveling control unit configured to control traveling of the host vehicle so that the host vehicle travels in accordance with the traveling plan generated by the traveling plan generation unit, wherein the traveling plan generation unit is configured to generate a traveling plan for the host vehicle to pass the preceding vehicle ahead when the passing request flag is established and the passing restraint flag is not established, and to generate a traveling plan for the host vehicle not to pass the preceding vehicle ahead when the passing request flag is not established and the passing restraint flag is established, and the passing restraint determination unit is configured to establish the passing restraint flag in any of the following cases: a case in which a distance between a merging point of the traveling lane along which the host vehicle and the preceding vehicle travel and a merging lane merging into the traveling lane, and a position of the preceding vehicle having passed through the merging point is equal to or less than a third threshold; a case in which the preceding vehicle travels along the merging lane and then moves to the traveling lane along which the host vehicle travels, and a time elapsed after the preceding vehicle has moved to the traveling lane is equal to or less than a fourth threshold; a case in which a distance between a maximum speed increase point at which a maximum speed, stipulated by laws and ordinances, of the traveling lane along which the host vehicle and the preceding vehicle travel increases and a position of the preceding vehicle having passed through the maximum speed increase point is equal to or less than a fifth threshold; a case in which the distance between the maximum speed increase point and the position of the preceding vehicle having passed through the maximum speed increase point is equal to or less than the fifth threshold, and a difference between a speed of the preceding vehicle having passed through the maximum speed increase point and the maximum speed before increase at the maximum speed increase point is equal to or less than a sixth threshold; a case in which the distance between the maximum speed increase point and the position of the preceding vehicle having passed through the maximum speed increase point is equal to or less than the fifth threshold, and a difference between the speed of the preceding vehicle having passed through the maximum speed increase point and the maximum speed after increase at the maximum speed increase point is equal to or greater than a seventh threshold; a case in which a time for which a state where the speed of the preceding vehicle is equal to or less than an eighth threshold continues is equal to or greater than a ninth threshold; a case in which a time elapsed after a state where the speed of the preceding vehicle exceeds the eighth threshold from a state where the time for which a state where the speed of the preceding vehicle is equal to or less than the eighth threshold continues is equal to or greater than the ninth threshold is equal to or less than a tenth threshold; a case in which the traveling plan generation unit generates the traveling plan to decelerate the host vehicle; and a case in which, when the traveling plan generation unit generates the traveling plan to decelerate the host vehicle, a predicted relative speed between the preceding vehicle when the host vehicle comes close to the preceding vehicle and the host vehicle after deceleration based on the traveling plan is less than the second threshold.

According to such a configuration, the passing restraint flag for restraining the host vehicle from passing the preceding vehicle ahead is established by the passing restraint determination unit. In addition, when the passing restraint flag is established, the traveling plan for the host vehicle not to pass the preceding vehicle ahead is generated by the traveling plan generation unit. The passing restraint determination unit establishes the passing restraint flag when there is the possibility of an inappropriate operation of passing occurring such as when a distance between the merging point of the traveling lane along which the host vehicle travels and the merging lane merging into the traveling lane, and a position of the preceding vehicle having passed through the merging point is equal to or less than the third threshold. Thereby, it is possible to reduce the occurrence of an inappropriate operation of passing.

In an aspect of the present invention, the passing restraint determination unit may be configured to establish the passing restraint flag when the inter-vehicle distance between the preceding vehicle and the host vehicle is equal to or less than an eleventh threshold, and an absolute value of deceleration of the preceding vehicle is equal to or greater than a twelfth threshold.

According to such a configuration, the passing restraint determination unit establishes the passing restraint flag when the inter-vehicle distance between the preceding vehicle and the host vehicle is equal to or less than the eleventh threshold, the absolute value of deceleration of the preceding vehicle is equal to or greater than the twelfth threshold, and the operation of passing has the possibility of interfering with a traffic flow in the vicinity of the host vehicle and the possibility of being associated with a sudden change in the traveling state of the host vehicle. Thereby, it is possible to reduce the occurrence of an inappropriate operation of passing which has the possibility of interfering with a traffic flow in the vicinity of the host vehicle and the possibility of being associated with a sudden change in the traveling state of the host vehicle.

In addition, in an aspect of the present invention, the passing restraint determination unit may be configured to establish the passing restraint flag in any of the following cases: a case in which a direction indicator of the preceding vehicle is turned on, and there is an adjacent lane to which the preceding vehicle is capable of moving from the traveling lane along which the host vehicle and the preceding vehicle travel in a direction indicated by the direction indicator; and a case in which a branching point between a branching lane branching from the traveling lane along which the host vehicle and the preceding vehicle travel and the traveling lane is present in front of the preceding vehicle, and a distance between the position of the preceding vehicle and the branching point is equal to or less than a thirteenth threshold.

According to such a configuration, the passing restraint determination unit establishes the passing restraint flag when there is possibility of passing not being required such as when the direction indicator of the preceding vehicle is turned on, and there is the adjacent lane to which the preceding vehicle can move from the traveling lane along which the host vehicle and the preceding vehicle travel in a direction indicated by the direction indicator. Thereby, it is possible to reduce the occurrence of an inappropriate operation of passing which has the possibility of passing not being required.

According to the vehicle control device of the aspects of the present invention, it is possible to reduce the occurrence of an inappropriate operation of passing.

DETAILED DESCRIPTION

Hereinafter, embodiments of the present invention will be described in detail with the accompanying drawings.

First Embodiment

Figure 1:
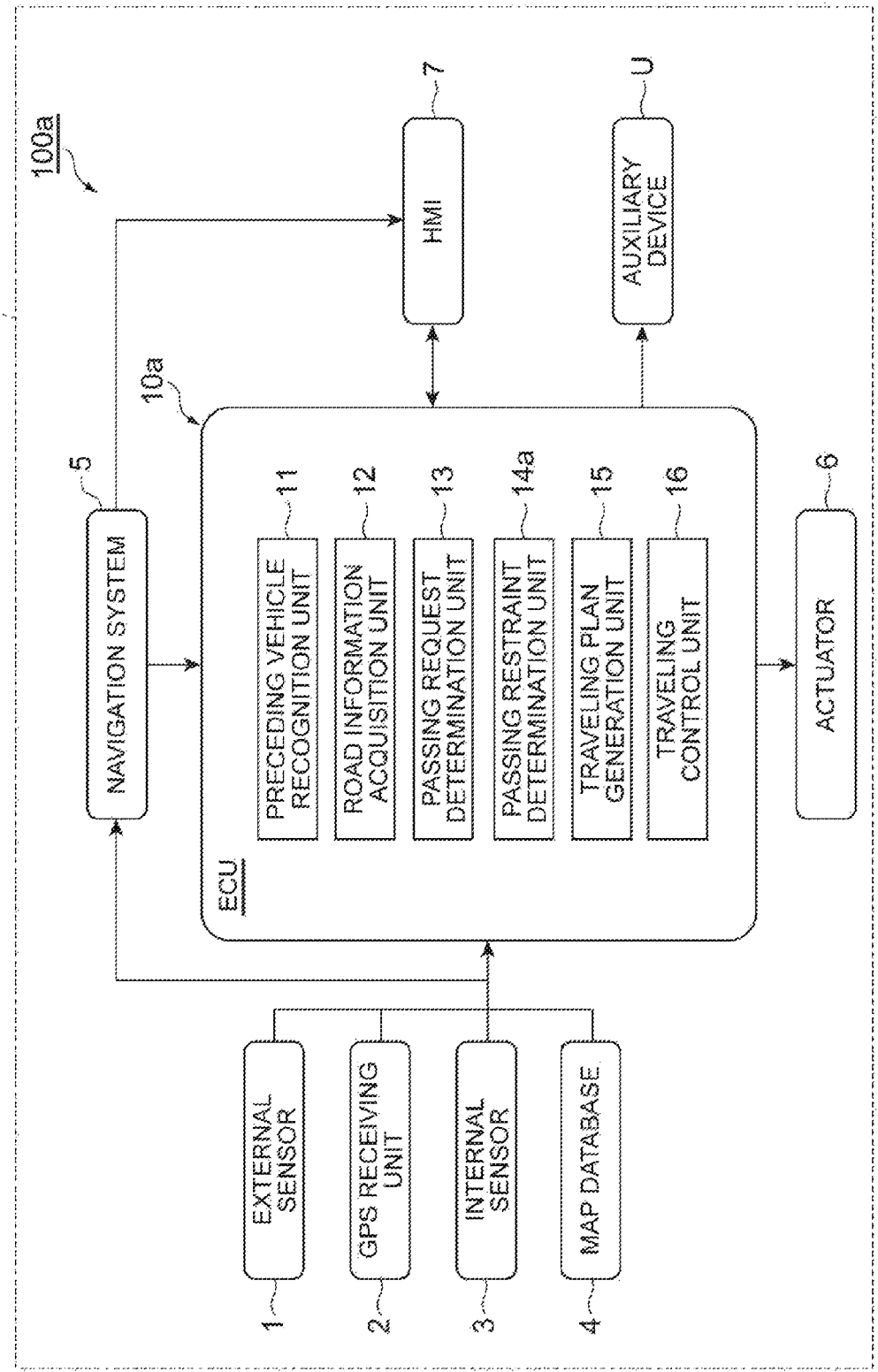
FIG. 1 is a block diagram illustrating a configuration of a vehicle control device according to a first embodiment.

A vehicle control device 100a according to a first embodiment shown in FIG. 1 is mounted in a host vehicle V. The vehicle control device 100a controls the traveling of the host vehicle V so as that the host vehicle V travels using automated driving. The automated driving means that an driving operation such as the acceleration, deceleration and steering of the host vehicle V is executed regardless of a driver's driving operation of the host vehicle V.

The vehicle control device 100a generates a traveling plan for the host vehicle V to travel using automated driving. The traveling plan means the determination of behavior performed in the future by the host vehicle V, and means, for example, the determination of the position, speed, acceleration, deceleration, jerk, steering angle, the state of turn-on of a headlight, the state of turn-on of a hazard lamp and the state of turn-on of a direction indicator of the host vehicle for each arbitrary time. The vehicle control device 100a generates a traveling plan for the host vehicle V to pass a preceding vehicle ahead and a traveling plan for the host vehicle V not to pass the preceding vehicle ahead, in accordance with a situation. The vehicle control device 100a controls the traveling of the host vehicle V so that host vehicle V travels in accordance with the generated traveling plan.

As shown in FIG. 1, the vehicle control device 100a includes an external sensor 1, a global positioning system [GPS] receiving unit 2, an internal sensor 3, a map database 4, a navigation system 5, an actuator 6, a human machine interface [HMI] 7, an auxiliary device U and an electronic control unit [ECU] 10a.

The external sensor 1 is a detection device that detects an external situation which is peripheral information of the host vehicle V. The external sensor 1 includes at least one of a camera, a radar, and a laser imaging detection and ranging [LIDAR]. The camera is an imaging device that images the external situation of the host vehicle V.

The camera is provided on, for example, the reverse side of the windshield of the host vehicle V. The camera transmits imaging information relating to the external situation of the host vehicle V to the ECU 10a. The camera may be a monocular camera, and may be a stereo camera. The stereo camera includes two imaging units which are disposed so as to reproduce a binocular parallax. Imaging information of the stereo camera also includes depth-direction information.

The radar detects an object, such as a preceding vehicle, located outside of the host vehicle V using radio waves (for example, millimeter waves). The radar transmits radio waves to the periphery of the host vehicle V and receives radio waves reflected from an object, to thereby detect the object. The radar transmits information relating to the detected object to the ECU 10a.

The lidar detects an object, such as a preceding vehicle, located outside of the host vehicle V using light. The lidar transmits light to the periphery of the host vehicle V and receives light reflected from an object, to thereby measure a distance to a reflection point and detect the object. The lidar transmits information relating to the detected object to the ECU 10a. The camera, the LIDAR and the radar are not necessarily required to be provided redundantly. In addition, the external sensor 1 may include a sonar that transmits ultrasonic waves to the periphery of the host vehicle V and receives ultrasonic waves reflected from an object, to thereby detect the object.

The GPS receiving unit 2 receives a signal from three or more GPS satellites, to thereby measure the position of the host vehicle V (for example, the latitude and longitude of the host vehicle V). The GPS receiving unit 2 transmits location information relating to the measured position of the host vehicle V to the ECU 10a. Meanwhile, other means capable of specifying the position of the host vehicle V such as the latitude and longitude of the host vehicle V may be used instead of the GPS receiving unit 2. For example, the position of the host vehicle V may be specified using inertial navigation, road-to-vehicle communication between roadside facilities, and the like.

The internal sensor 3 is a detection device that detects the traveling state of the host vehicle V. The internal sensor 3 includes at least one of a speed sensor, an acceleration sensor and a yaw rate sensor. The speed sensor is a detector that detects the speed of the host vehicle V. An example of the speed sensor to be used includes a wheel speed sensor, provided on the wheel of the host vehicle V, a drive shaft rotating integrally with the wheel, or the like, which detects the rotational speed of the wheel. The speed sensor transmits speed information relating to the detected speed of the host vehicle V (information relating to the rotational speed of the wheel) to the ECU 10a.

The acceleration sensor is a detector that detects the acceleration of the host vehicle V. The acceleration sensor includes, for example, a front-back acceleration sensor that detects the acceleration of the host vehicle V in a front-back direction and a lateral acceleration sensor that detects the lateral acceleration of the host vehicle V. The acceleration sensor transmits, for example, acceleration information of the host vehicle V to the ECU 10a. The yaw rate sensor is a detector that detects a yaw rate (rotational angular velocity) around the vertical axis of the centroid of the host vehicle V. For example a gyro sensor can be used as the yaw rate sensor. The yaw rate sensor transmits information of the detected yaw rate of the host vehicle V to the ECU 10a.

The map database 4 is a database including map information. The map database is formed within, for example, a hard disk drive [HDD] which is mounted in the host vehicle V. The map information includes, for example, position information of a road and information of a road shape (such as, for example, a curve, the type of linear portion, the curvature of the curve, inclination, or the type of whether being a climbing lane). In addition, the map information includes information relating to the arrangement of lanes, position information of an intersection point, position information of a merging point and position information of a branching point. In addition, the map information includes information relating to the maximum speed of a road stipulated by laws and ordinances and information relating to position information of a maximum speed increase point at which the maximum speed of a road stipulated by laws and ordinances increases. Further, it is preferable to include the output signal of the external sensor 1 in information relating to the position or shape of a three-dimensional structure such as a building or a wall, or the map information in order to use a simultaneous localization and mapping (SLAM) technique. Meanwhile, the map database 4 may be stored in a computer of a facility such as an information processing center capable of communicating with the host vehicle V.

The navigation system 5 is a device that guides a driver of the host vehicle V to a destination which is set by the driver of the host vehicle V. The navigation system 5 calculates a route along which the host vehicle V travel, on the basis of the position information of the host vehicle V measured by the GPS receiving unit 2 and the map information of the map database 4. The navigation system 5 calculates, for example, a target route from the position of the host vehicle V to a destination, and notifies a driver of the target route through the indication of a display of the HMI 7 and the sound output of the speaker of the HMI 7. The navigation system 5 transmits information of the target route of the host vehicle V to the ECU 10a. Meanwhile, the navigation system 5 may be stored in a computer of a facility such as an information processing center capable of communicating with the host vehicle V.

The actuator 6 is a device that controls the behavior of the host vehicle V during automated driving such as the acceleration, deceleration and steering of the host vehicle V. The actuator 6 includes at least an engine actuator, a brake actuator, and a steering actuator. The engine actuator controls the amount of air (throttle opening) supplied to an engine in accordance with a control signal from the ECU 10a, and controls the driving force of the host vehicle V. Meanwhile, when the host vehicle V is a hybrid car, the control signal from the ECU 10a is input to a motor as a motive power source and the driving force is controlled, in addition to the amount of air supplied to the engine. When the host vehicle V is an electric automobile, the control signal from the ECU 10a is input to the motor as a motive power source and the driving force is controlled.

The brake actuator controls a braking system in accordance with the control signal from the ECU 10a, and controls a braking force which is given to the wheel of the host vehicle V. As the braking system, for example, a hydraulic braking system can be used. The steering actuator controls the driving of an assist motor that controls a steering torque in an electromotive power steering system, in accordance with the control signal from the ECU 10a. Thereby, the steering actuator controls the steering torque of the host vehicle V.

The HMI 7 is an interface for outputting and inputting information between an occupant (including a driver) of the host vehicle V and the vehicle control device 100a. The HMI 7 includes, for example, a display panel for displaying image information to an occupant, a speaker for outputting a sound, an operation button or a touch panel for an occupant to perform an input operation, a microphone for an occupant to perform a sound input, and the like.

The auxiliary device U refers to a generic device which is not included in the actuator 6. The auxiliary device U in the present embodiment includes, for example, a headlight, a direction indicator, a hazard lamp, an air conditioning device, a windshield wiper, and the like. The headlight, the direction indicator, the hazard lamp, and the like of the auxiliary device U are turned on by the control signal from the ECU 10a. Meanwhile, the auxiliary device U may be automatically controlled by the control signal from the ECU 10a in accordance with temperature, weather or the like in the vicinity of the host vehicle V.

The ECU 10a controls the operation of each unit of the vehicle control device 100a during automated driving. The ECU 10a is an electronic control unit including a central processing unit [CPU], a read only memory [ROM], a random access memory [RAM], and the like. The ECU 10a includes a preceding vehicle recognition unit 11, a road information acquisition unit 12, a passing request determination unit 13, a passing restraint determination unit 14a, a traveling plan generation unit 15 and a traveling control unit 16. In the ECU 10a, a program stored in the ROM is loaded into the RAM and is executed by the CPU, to thereby execute the control of each unit of the preceding vehicle recognition unit 11 or the like. The ECU 10a may be constituted by a plurality of electronic control units.

The preceding vehicle recognition unit 11 recognizes a preceding vehicle traveling in front of the host vehicle V through the external sensor 1. The preceding vehicle traveling in front of the host vehicle V is also inclusive of vehicles traveling in front of a vehicle traveling immediately before the host vehicle V, other than the vehicle traveling immediately before the host vehicle V. The preceding vehicle recognition unit 11 acquires an inter-vehicle distance between the preceding vehicle and the host vehicle V, a relative speed between the preceding vehicle and the host vehicle V when the host vehicle V comes close to the preceding vehicle, the speed of the preceding vehicle, the position of the preceding vehicle, and information relating to the traveling direction of the preceding vehicle. The preceding vehicle recognition unit 11 may acquires information relating to a history of the position and behavior of the preceding vehicle. Meanwhile, in a state where the host vehicle V includes a communication device, the preceding vehicle recognition unit 11 may recognize the preceding vehicle through vehicle-to-vehicle communication between the preceding vehicle and the host vehicle V, or road-to-vehicle communication between a roadside facility capable of acquiring information relating to the preceding vehicle and the host vehicle V.

The road information acquisition unit 12 acquires road information relating to a traveling lane along which the host vehicle V and the preceding vehicle travel, through the external sensor 1, the GPS receiving unit 2 and the map database 4. The road information includes information relating to the position of a merging point of a traveling lane along which the host vehicle V travels and a merging lane merging into the traveling lane, information relating to the position of a maximum speed increase point at which the maximum speed, stipulated by laws and ordinances, of the traveling lane along which the host vehicle V travels increases, information relating to a maximum speed increasing at the maximum speed increase point, information relating to the position of an adjacent lane to which the preceding vehicle can move from the traveling lane along which the host vehicle V and the preceding vehicle travel, and information relating to the position of a branching point between a branching lane branching from the traveling lane along which the host vehicle V and the preceding vehicle travel and the traveling lane. In addition, the road information may include information relating to the speed of traffic flow of the traveling lane along which the host vehicle V and the preceding vehicle travel, or information relating to the presence or absence of a traffic jam of the traveling lane.

When the inter-vehicle distance between the preceding vehicle recognized by the preceding vehicle recognition unit 11 and the host vehicle V is equal to or less than a first threshold, and the relative speed between the preceding vehicle and the host vehicle V when the host vehicle V comes close to the preceding vehicle recognized by the preceding vehicle recognition unit 11 is equal to or greater than a second threshold, the passing request determination unit 13 establishes a passing request flag for requesting that the host vehicle V pass the preceding vehicle ahead. The first threshold is a threshold of a distance for determining whether the operation of passing starts. The second threshold is a threshold of a relative speed for determining whether the operation of passing starts. Meanwhile, as the relative speed between the preceding vehicle and the host vehicle V becomes higher, the first threshold may be set to become larger. In addition, as the inter-vehicle distance between the preceding vehicle and the host vehicle V becomes larger, the second threshold may be set to become larger.

Regarding the relative speed, it is possible to use a relative speed between the preceding vehicle and the host vehicle V directly acquired by the radar or the like of the external sensor 1. In addition, the relative speed can be calculated by a difference between the speed of the host vehicle V and the speed of the preceding vehicle which is acquired by the external sensor 1, vehicle-to-vehicle communication between the preceding vehicle and the host vehicle V, and road-to-vehicle communication between the roadside facility capable of acquiring information relating to the preceding vehicle and the host vehicle V. The speed of the host vehicle V for calculating the relative speed can be acquired by the speed sensor of the internal sensor 3. In addition, regarding the speed of the host vehicle V for calculating the relative speed, it is possible to use an average speed of the host vehicle V, for a few seconds in the past, acquired by the speed sensor of the internal sensor 3. In addition, regarding the speed of the host vehicle V for calculating the relative speed, it is possible to use the speed of the host vehicle V in the traveling plan generated by the traveling plan generation unit 15.

The passing restraint determination unit 14a establishes a passing restraint flag for restraining the host vehicle V from passing the preceding vehicle ahead, on the basis of any of the state of the preceding vehicle recognized by the preceding vehicle recognition unit 11 and the road information acquired by the road information acquisition unit. A passing restraint determination process of determining whether the passing restraint determination unit 14a establishes a passing restraint flag will be described later.

The traveling plan generation unit 15 generates the traveling plan of the host vehicle V on the basis of the state of the preceding vehicle recognized by the preceding vehicle recognition unit 11, the road information acquired by the road information acquisition unit 12, the passing request flag established by the passing request determination unit 13, and the passing restraint flag established by the passing restraint determination unit 14a.

When the passing request flag is established and the passing restraint flag is not established, the traveling plan generation unit 15 generates a traveling plan for the host vehicle V to pass a preceding vehicle ahead. The traveling plan for the host vehicle V to pass a preceding vehicle ahead means, for example, a traveling plan for the host vehicle V to move to an adjacent lane which is adjacent to a traveling lane along which the host vehicle V and the preceding vehicle travel, pass the preceding vehicle ahead, and to move to the traveling lane along which the host vehicle V and the preceding vehicle have traveled from the adjacent lane. In addition, the traveling plan for the host vehicle V to pass a preceding vehicle ahead means, for example, a traveling plan for the host vehicle V to move to an adjacent lane which is adjacent to a traveling lane along which the host vehicle V and the preceding vehicle travel, and pass the preceding vehicle ahead, and to continue to travel along the adjacent lane.

When the passing request flag is not established and the passing restraint flag is established, the traveling plan generation unit 15 generates a traveling plan for the host vehicle V not to pass the preceding vehicle ahead. The traveling plan for the host vehicle V not to pass the preceding vehicle ahead means, for example, a traveling plan for causing the host vehicle V to travel following a preceding vehicle P while maintaining its lane so that a distance between the preceding vehicle and the host vehicle V is set to an inter-vehicle distance which is set in advance.

The traveling plan generation unit 15 extracts, for example, road information of a traveling lane along which the host vehicle V travels from the road information acquisition unit 12, and generates a traveling plan on the basis of the shape of the curve or the like of the traveling lane, the maximum speed, stipulated by laws and ordinances, of the traveling lane, the speed of traffic flow of the traveling lane, and the presence or absence of a traffic jam of the traveling lane. The traveling plan generation unit 15 can acquire information relating to the speed of traffic flow of the traveling lane and the presence or absence of a traffic jam of the traveling lane, described later, on the basis of the speed of the preceding vehicle recognized by the preceding vehicle recognition unit 11, or the speed of the host vehicle V detected by the speed sensor of the internal sensor 3. In addition, the traveling plan generation unit 15 generates a traveling plan so that the host vehicle V avoids an obstacle detected by the external sensor 1.

The traveling control unit 16 controls the traveling of the host vehicle V by outputting a control signal to the actuator 6 so that the host vehicle V travels in accordance with the traveling plan generated by the traveling plan generation unit 15.

(Basic Process)

Figure 2:
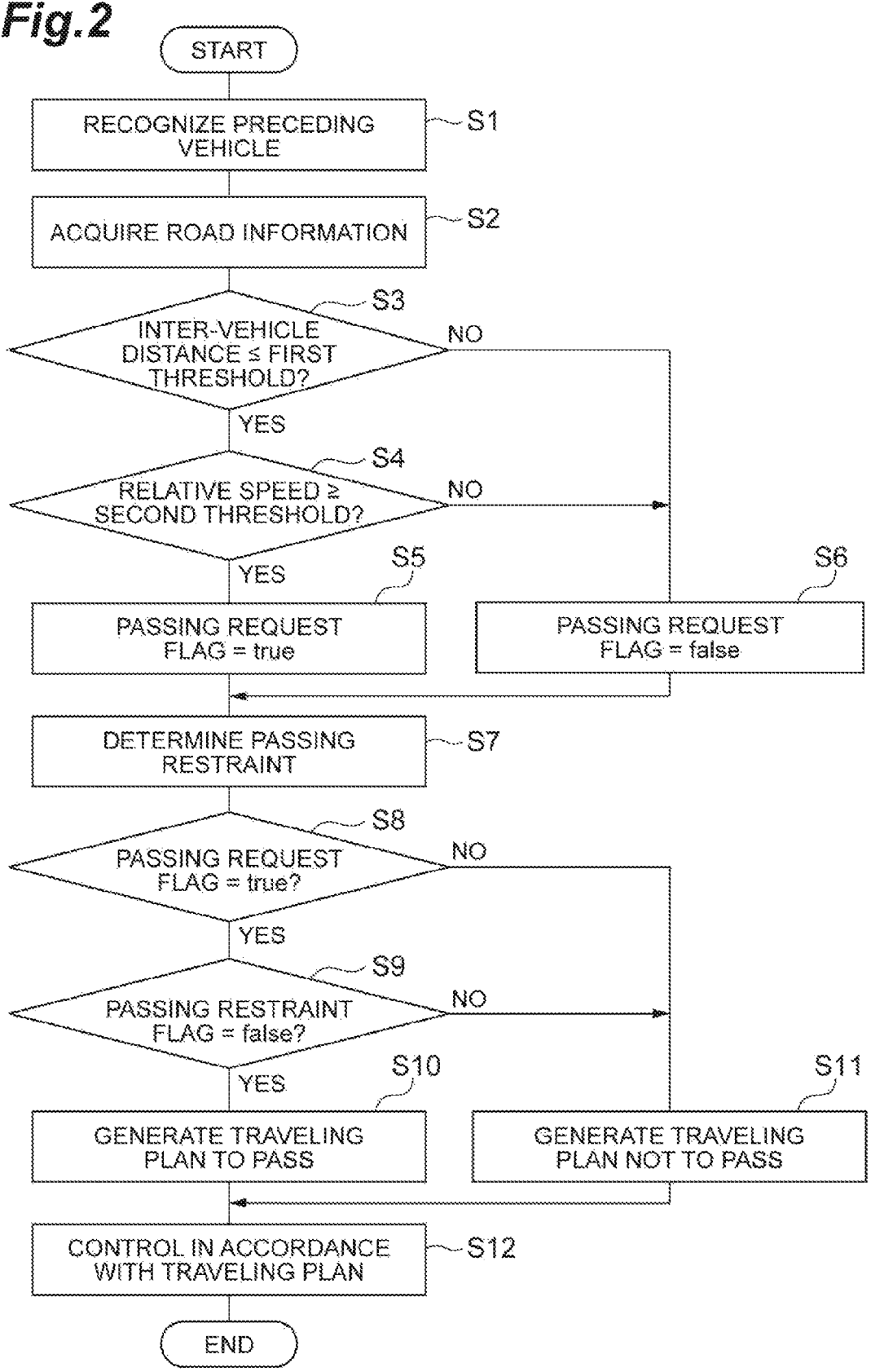
FIG. 2 is a flow diagram illustrating a basic process of the vehicle control device of FIG. 1.

Next, processes which are executed in the vehicle control device 100a will be described. First, a basic process of the vehicle control device 100a will be described. As shown in FIG. 2, the preceding vehicle recognition unit 11 of the ECU 10a of the vehicle control device 100a recognizes a preceding vehicle traveling in front of the host vehicle V (S1). The road information acquisition unit 12 of the ECU 10a of the vehicle control device 100a acquires road information relating to a traveling lane along which the host vehicle V and the preceding vehicle travel (S2).

When the inter-vehicle distance between the preceding vehicle recognized by the preceding vehicle recognition unit 11 and the host vehicle V is equal to or less than the first threshold (S3), and the relative speed between the preceding vehicle and the host vehicle V when the host vehicle V comes close to the preceding vehicle recognized by the preceding vehicle recognition unit 11 is equal to or greater than the second threshold (S4), the passing request determination unit 13 of the ECU 10a of the vehicle control device 100a establishes a passing request flag for requesting that the host vehicle V pass the preceding vehicle ahead (S5). On the other hand, when the inter-vehicle distance exceeds the first threshold (S3) or the relative speed less than the second threshold (S4), the passing request determination unit 13 does not establish the passing request flag (S6).

The passing restraint determination unit 14a of the ECU 10a of the vehicle control device 100a performs a passing restraint determination of establishing a passing restraint flag for restraining the host vehicle V from passing the preceding vehicle ahead, on the basis of any of the state of the preceding vehicle recognized by the preceding vehicle recognition unit 11 and the road information acquired by the road information acquisition unit 12 (S7). The details of a passing restraint determination process will be described later.

When the passing request flag is established (S8) and the passing restraint flag is not established (S9), the traveling plan generation unit 15 of the ECU 10a of the vehicle control device 100a generates a traveling plan for the host vehicle V to pass the preceding vehicle ahead (S10). On the other hand, when the passing request flag is not established (S8) and the passing restraint flag is established (S9), the traveling plan generation unit 15 generates a traveling plan for the host vehicle V not to pass the preceding vehicle ahead (S11). The traveling control unit 16 of the ECU 10a of the vehicle control device 100a controls the traveling of the host vehicle V so that the host vehicle V travels in accordance with the traveling plan generated by the traveling plan generation unit 15 (S12).

(Passing Restraint Determination)

Figure 3:
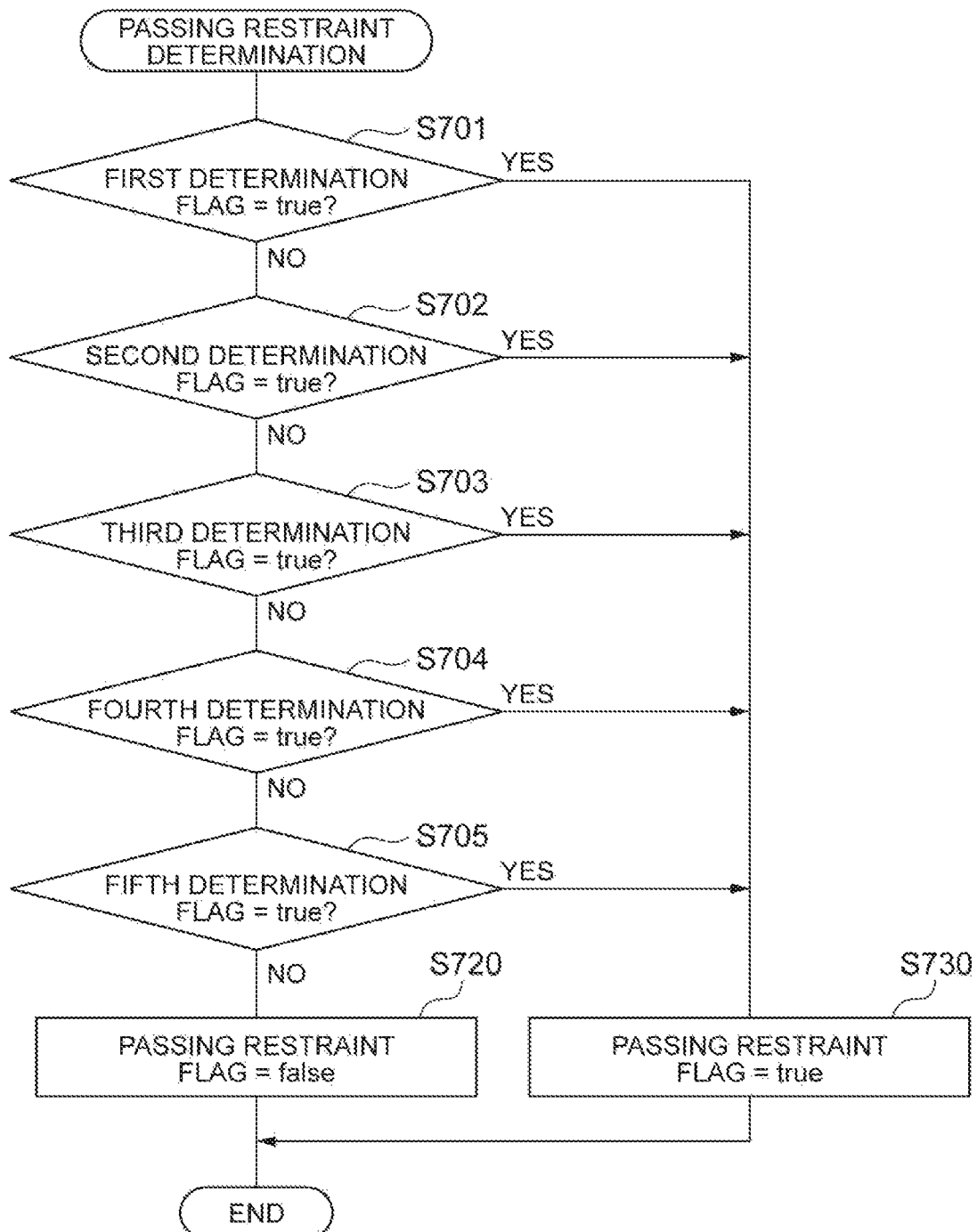
FIG. 3 is a flow diagram illustrating a passing restraint determination process in the first embodiment of FIG. 2.

Hereinafter, the passing restraint determination process in S7 FIG. 2 will be described. As shown in FIG. 3, when a first determination flag is not established in a first determination process (S701), a second determination flag is not established in a second determination process (S702), a third determination flag is not established in a third determination process (S703), a fourth determination flag is not established in a fourth determination process (S704), and a fifth determination flag is not established in a fifth determination process (S705), the passing restraint determination unit 14a does not establish the passing restraint flag (S720).

On the other hand, when the first determination flag is established in the first determination process (S701), the second determination flag is established in the second determination process (S702), the third determination flag is established in the third determination process (S703), the fourth determination flag is established in the fourth determination process (S704), and the fifth determination flag is established in the fifth determination process (S705), the passing restraint determination unit 14a establishes the passing restraint flag (S730). Hereinafter, the details of the first determination process (S701) to the fifth determination process (S705) will be described.

(First Determination Process)

Figure 4:
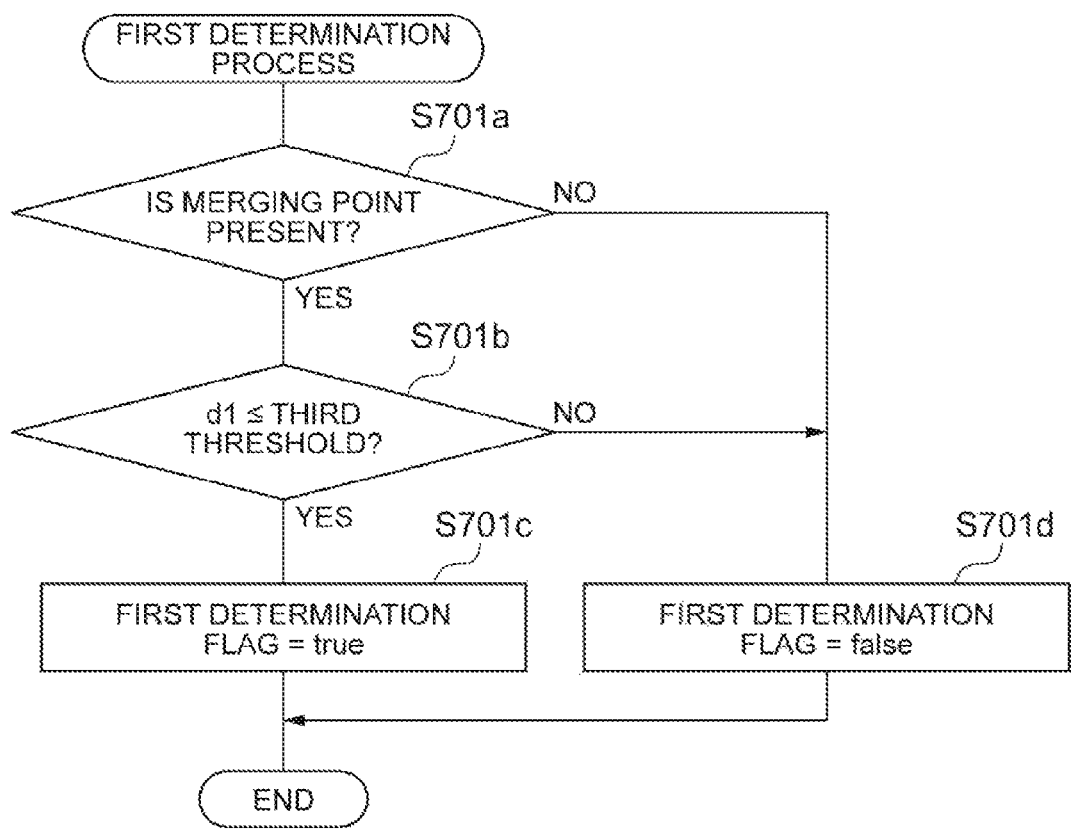
FIG. 4 is a flow diagram illustrating an example of a first determination process of FIG. 3.

Hereinafter, the first determination process in S701 of FIG. 3 will be described. In the first determination process, when it is predicted that, immediately after the preceding vehicle moves to a traveling lane along which the host vehicle V travels from a merging lane, the preceding vehicle accelerates, and the relative speed decreases, the passing restraint flag is established by establishing the first determination flag. As shown in FIG. 4, the passing restraint determination unit 14a determines whether merging points 111a and 111b of a traveling lane 101 along which the host vehicle V and the preceding vehicle P travel and a merging lane 102 merging into the traveling lane 101, as shown in FIG. 5, are present (S701a).

The merging point may be set to the starting end of an interval in which movement from the merging lane 102 to the traveling lane 101 can be made as in the merging point 111a, may be set to a position in front by an arbitrary distance from the terminating end of the interval in which movement from the merging lane 102 to the traveling lane 101 can be made as the merging point 111b, and may be set to an arbitrary position between the merging point 111a and the merging point 111b.

As shown in FIG. 4, when the merging points 111a and 111b are present (S701a), the passing restraint determination unit 14a determines whether a distance d1 between the merging points 111a and 111b and the position of the preceding vehicle P having passed through the merging points 111a and 111b is equal to or less than a third threshold (S701b). The third threshold is a threshold of the distance d1 for determining whether the preceding vehicle P has passed through the merging points 111a and 111b and then has terminated acceleration.

Figure 5:
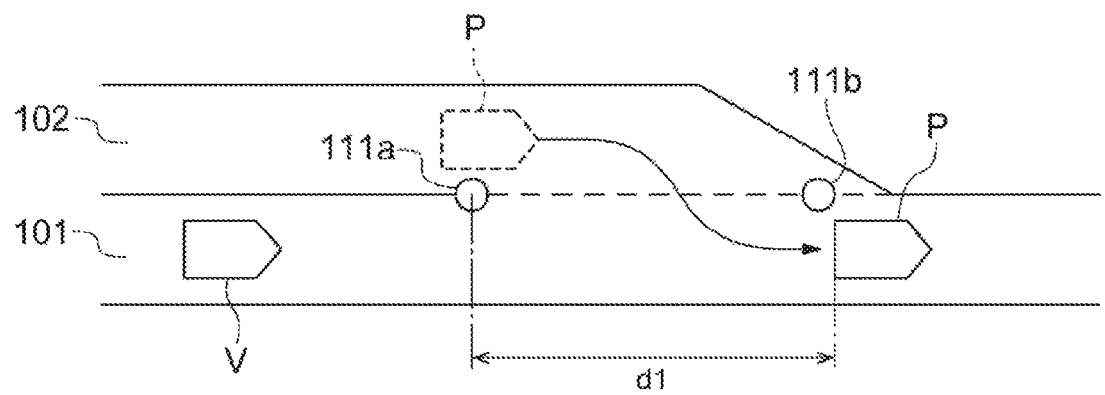
FIG. 5 is a diagram illustrating a situation in which a preceding vehicle travels along a merging lane and then moves to a traveling lane along which a host vehicle travels.

Meanwhile, in the example of FIG. 5, the position of the preceding vehicle P is based on the rear end of the preceding vehicle P, but the position of the preceding vehicle P may be based on the centroid of the preceding vehicle P or the front end of the preceding vehicle P. In addition, in the example of FIG. 5, the distance d1 between the merging points 111a and 111b and the position of the preceding vehicle P having passed through the merging points 111a and 111b is based on a distance in a straight line between the merging points 111a and 111b and the position of the preceding vehicle P, but the distance d1 may be based on a distance along the shapes of the merging lane 102 and the traveling lane 101 between the merging points 111a and 111b and the position of the preceding vehicle P. In addition, the distance d1 may be calculated by the product of a time elapsed after the preceding vehicle P has passed through the merging points 111a and 111b and the speed of the preceding vehicle P or the speed of the host vehicle V.

When the merging points 111a and 111b are present (S701a) and the distance d1 is equal to or less than the third threshold (S701b), the passing restraint determination unit 14a establishes the first determination flag (S701c). On the other hand, when the merging points 111a and 111b are not present (S701a) and the distance d1 exceeds the third threshold (S701b), the passing restraint determination unit 14a does not establish the first determination flag (S701d). Meanwhile, when the merging points 111a and 111b are present (S701a) and the speed of the preceding vehicle P is slower than an arbitrary threshold in addition to the distance d1 being equal to or less than to the third threshold (S701b), the passing restraint determination unit 14a may establish the first determination flag.

In the example of the first determination process based on the processes of S701a to S701d, when it is predicted that, immediately after the preceding vehicle P moves to the traveling lane 101 along which the host vehicle V travels from the merging lane 102, the preceding vehicle P accelerates and the relative speed decreases, the passing restraint flag is established by establishing the first determination flag, and thus it is possible to reduce the occurrence of an inappropriate operation of passing.

Figure 6:
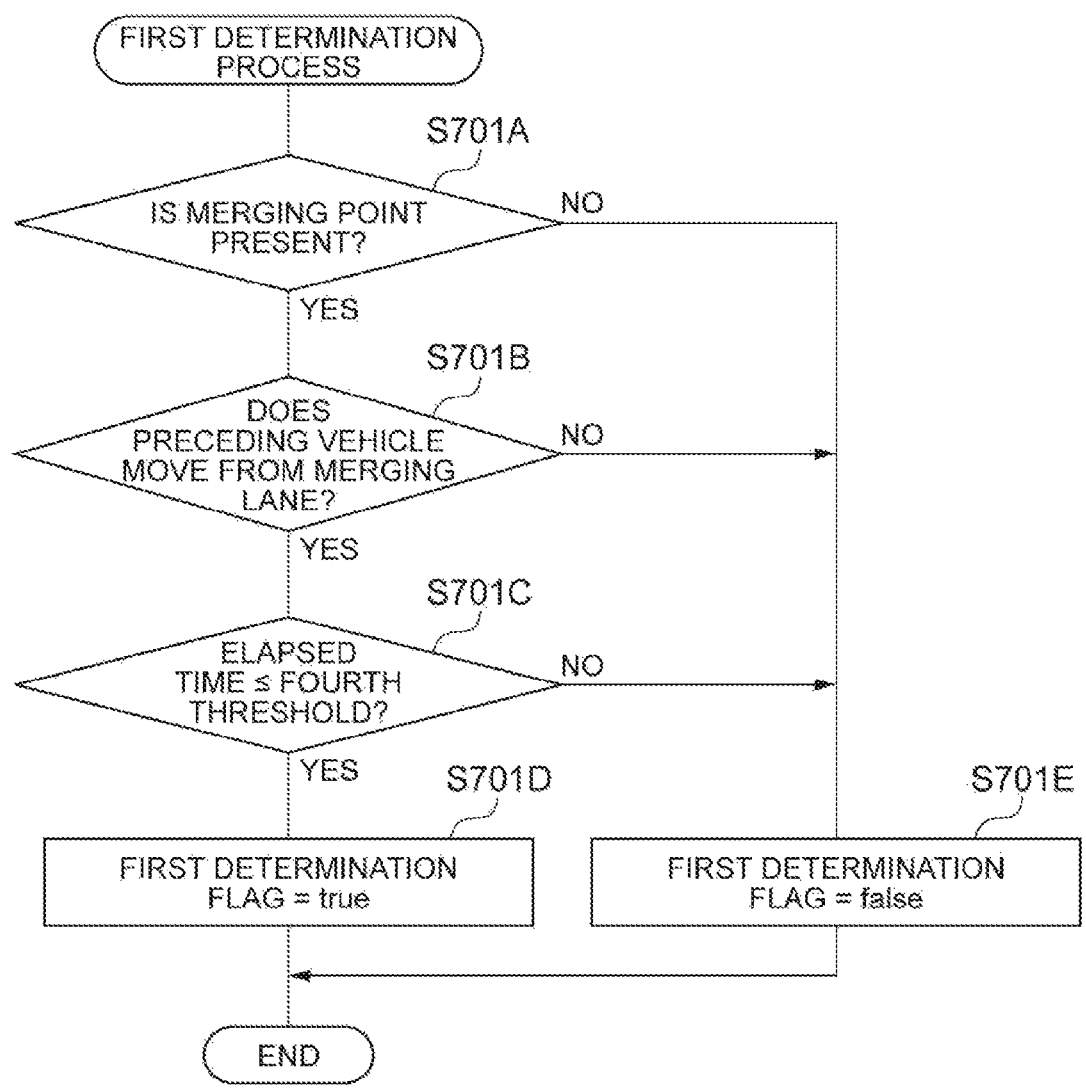
FIG. 6 is a flow diagram illustrating another example of the first determination process of FIG. 3.

Hereinafter, another example of the first determination process will be described. In the first determination process described below, the preceding vehicle recognition unit 11 acquires information relating to a history of the position and behavior of the preceding vehicle P. As shown in FIG. 6, similarly to S701a, the passing restraint determination unit 14a determines whether the merging points 111a and 111b are present (S701A).

When the merging points 111a and 111b are present (S701A), the passing restraint determination unit 14a determines whether the preceding vehicle P travels along the merging lane 102 and then moves to the traveling lane 101 along which the host vehicle V travels, on the basis of the information relating to a history of the position and behavior of the preceding vehicle P recognized by the preceding vehicle recognition unit 11 (S701B). When the preceding vehicle P travels along the merging lane 102 and then moves to the traveling lane 101 along which the host vehicle V travel (S701B), the passing restraint determination unit 14a determines whether a time elapsed after the preceding vehicle P has moved to the traveling lane 101 is equal to or less than a fourth threshold (S701C). The fourth threshold is a threshold of a time for determining whether the preceding vehicle P has moved from the merging lane 102 to the traveling lane 101 and then has terminated acceleration.

When the merging points 111a and 111b are present (S701A), the preceding vehicle P travels along the merging lane 102 and then moves to the traveling lane 101 along which the host vehicle V travels (S701B), and the time elapsed after the preceding vehicle P has moved to the traveling lane 101 is equal to or less than the fourth threshold (S701C), the passing restraint determination unit 14a establishes the first determination flag (S701D). On the other hand, when the merging points 111a and 111b are not present (S701A), the preceding vehicle P travels along the merging lane 102 and then dose not move to the traveling lane 101 along which the host vehicle V travels (S701B), and the time elapsed after the preceding vehicle P has moved to the traveling lane 101 exceeds the fourth threshold (S701C), the passing restraint determination unit 14a does not establish the first determination flag (S701E).

In the example of the first determination process based on the processes of S701A to S701E, in addition to an effect of the example of the first determination process based on the processes of S701a to S701d, since it is determined whether the preceding vehicle P has traveled along the merging lane 102 and then has moved to the traveling lane 101 along which the host vehicle V travels, on the basis of the information relating to a history of the position and behavior of the preceding vehicle P, it is possible to reduce the frequency of excessive restraint such as restraint of passing of the preceding vehicle P in the course of not being immediately after its movement from the merging lane 102 to the traveling lane 101.

(Second Determination Process)

Figure 7:
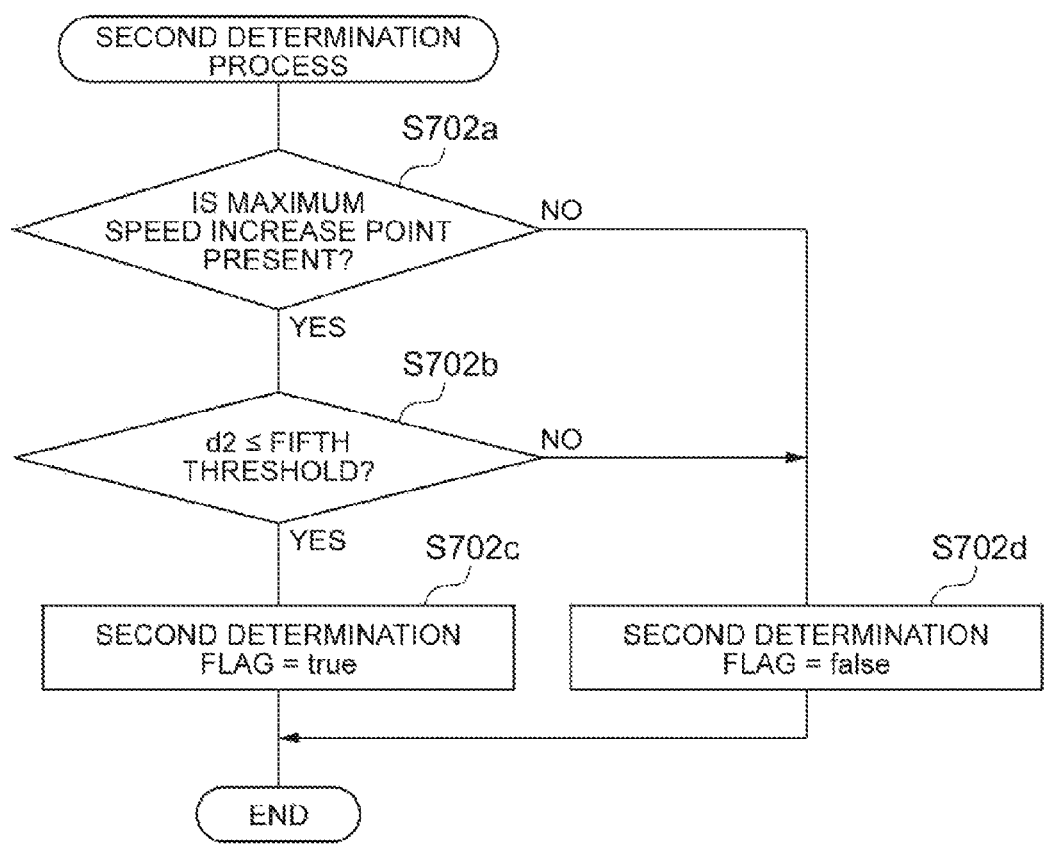
FIG. 7 is a flow diagram illustrating an example of a second determination process of FIG. 3.
Figure 8:
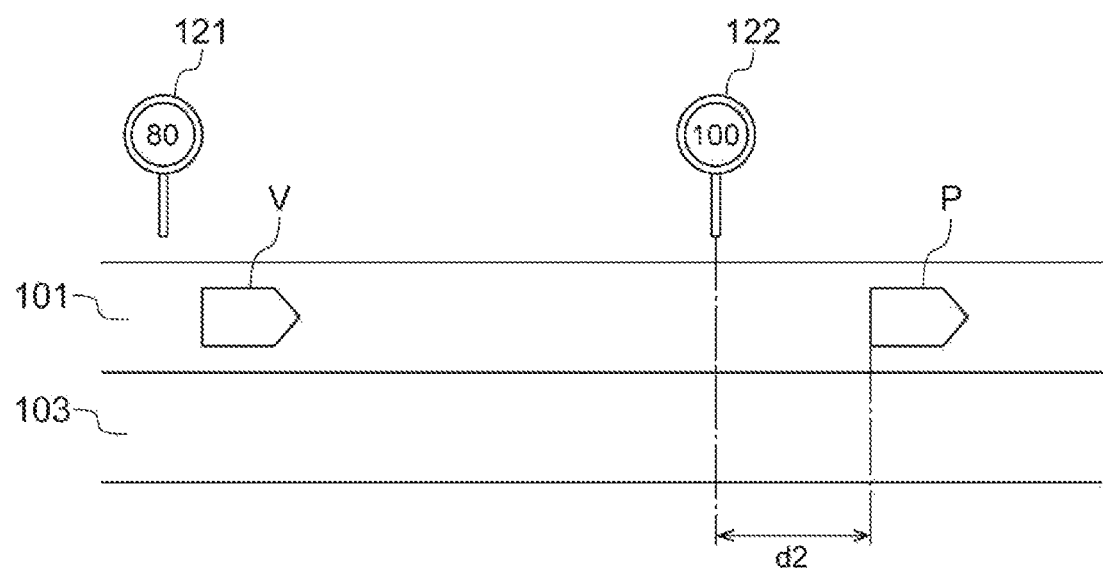
FIG. 8 is a diagram illustrating a situation in which the preceding vehicle has passed through a maximum speed increase point.

Hereinafter, the second determination process in S702 of FIG. 3 will be described. In the second determination process, when it is predicted that, immediately after the preceding vehicle P has passed through a maximum speed increase point at which the maximum speed, stipulated by laws and ordinances, of the traveling lane 101 increases, the preceding vehicle P accelerates and the relative speed decreases, the passing restraint flag is established by establishing the second determination flag. As shown in FIGS. 7 and 8, the passing restraint determination unit 14a determines whether a maximum speed increase point 122 is present at which the maximum speed, stipulated by laws and ordinances, of the traveling lane 101 along which the host vehicle V and the preceding vehicle P travel and an adjacent lane 103 increases, for example, from 80 [km/h] indicated by a speed-limit sign 121 to 100 [km/h] (S702a).

The passing restraint determination unit 14a can determine whether the maximum speed increase point 122 is present by the road information acquisition unit 12 referring to map data of the map database 4 corresponding to the position of the host vehicle V measured by the GPS receiving unit 2, or the road information acquisition unit 12 recognizing the speed-limit sign 121 and the speed-limit sign of the maximum speed increase point 122 through the external sensor 1. When the maximum speed increase point 122 is present (S702a), the passing restraint determination unit 14a determines whether a distance d2 between the maximum speed increase point 122 and the position of the preceding vehicle P having passed through the maximum speed increase point 122 is equal to or less than a fifth threshold (S702b). The fifth threshold is a threshold of the distance d2 for determining whether the preceding vehicle P has passed through the maximum speed increase point 122 and then has terminated acceleration.

Meanwhile, in the example of FIG. 8, the position of the preceding vehicle P is based on the rear end of the preceding vehicle P, but the position of the preceding vehicle P may be based on the centroid of the preceding vehicle P or the front end of the preceding vehicle P. In addition, in the example of FIG. 8, the distance d2 between the maximum speed increase point 122 and the position of the preceding vehicle P having passed through the maximum speed increase point 122 is based on a distance in a straight line between the maximum speed increase point 122 and the position of the preceding vehicle P, but the distance d2 may be based on a distance along the shape of the traveling lane 101 between the maximum speed increase point 122 and the position of the preceding vehicle P. In addition, the distance d2 may be calculated by the product of a time elapsed after the preceding vehicle P has passed through the maximum speed increase point 122 and the speed of the preceding vehicle P or the speed of the host vehicle V.

When the maximum speed increase point 122 is present (S702a) and the distance d2 is equal to or less than the fifth threshold (S702b), the passing restraint determination unit 14a establishes a second determination flag (S702c). On the other hand, when the maximum speed increase point 122 is not present (S702a) and the distance d2 exceeds the fifth threshold (S702b), the passing restraint determination unit 14a does not establish the second determination flag (S702d).

In the example of the second determination process based on the processes of S702a to S702d, when it is predicted that, immediately after the preceding vehicle P has passed through the maximum speed increase point 122, the preceding vehicle P accelerates and the relative speed decreases, the passing restraint flag is established by establishing the second determination flag, and thus it is possible to reduce the occurrence of an inappropriate operation of passing.

Figure 9:
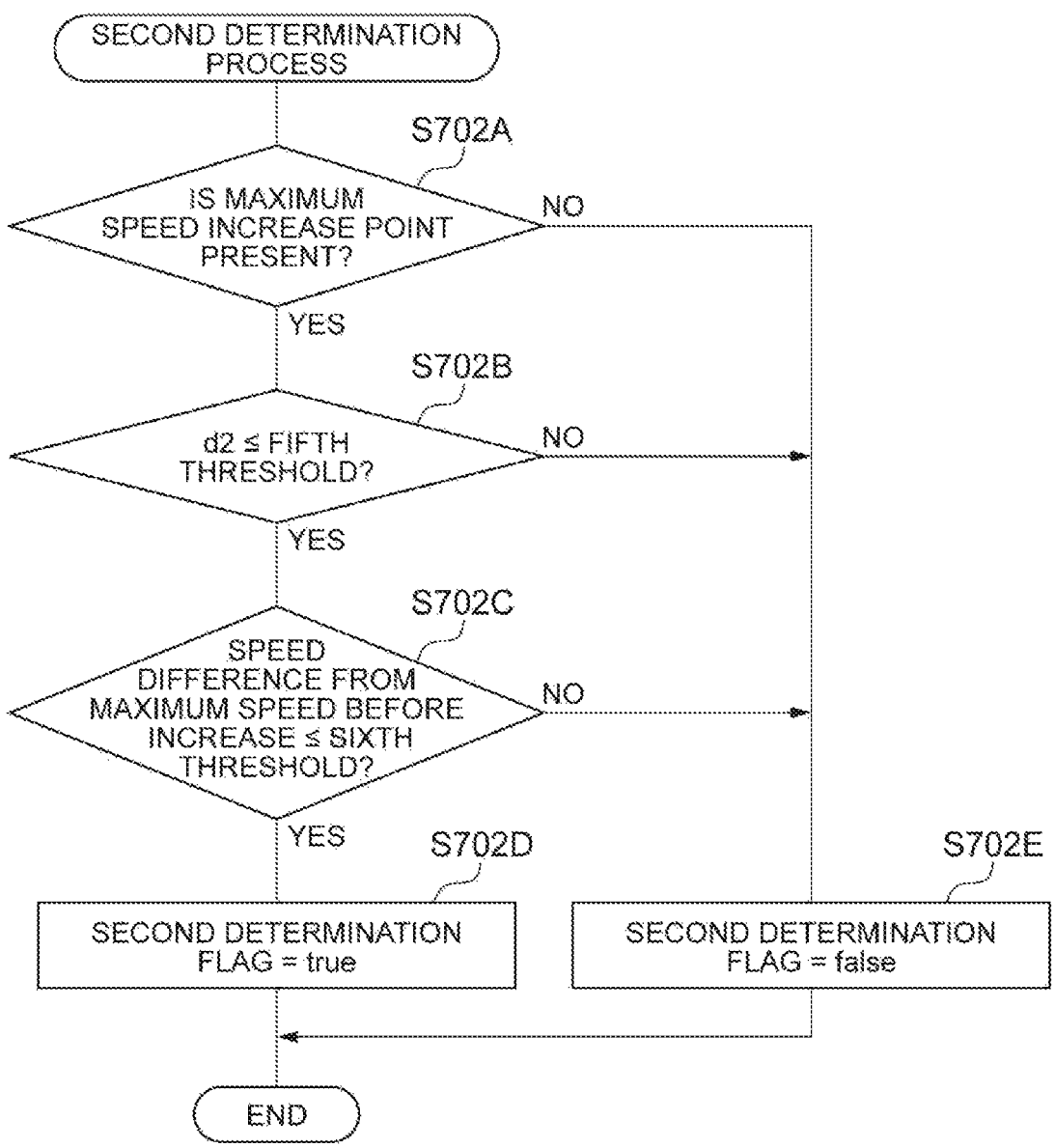
FIG. 9 is a flow diagram illustrating another example of the second determination process of FIG. 3.

Hereinafter, another example of the second determination process will be described. In the second determination process described below, the passing restraint determination unit 14a determines whether the preceding vehicle P has passed through the maximum speed increase point 122 and then has terminated acceleration, from a difference between the speed of the preceding vehicle P and the maximum speed before increase at the maximum speed increase point 122. As shown in FIG. 9, similarly to S702a, the passing restraint determination unit 14a determines whether the maximum speed increase point 122 is present (S702A). In addition, similarly to S702b, the passing restraint determination unit 14a determines whether the distance d2 is equal to or less than the fifth threshold (S702B).

When the maximum speed increase point 122 is present (S702A) and the distance d2 is equal to or less than the fifth threshold (S702B), the passing restraint determination unit 14a determines whether the difference between the speed of the preceding vehicle P having passed through the maximum speed increase point 122 and the maximum speed before increase at the maximum speed increase point 122 is equal to or less than a sixth threshold (S702C). The sixth threshold is a threshold of a speed difference for determining whether the preceding vehicle P has passed through the maximum speed increase point 122 and then has terminated acceleration.

When the maximum speed increase point 122 is present (S702A), the distance d2 is equal to or less than the fifth threshold (S702B), and the difference between the speed of the preceding vehicle P having passed through the maximum speed increase point 122 and the maximum speed before increase at the maximum speed increase point 122 is equal to or less than the sixth threshold (S702C), the passing restraint determination unit 14a establishes the second determination flag (S702D). On the other hand, when the maximum speed increase point 122 is not present (S702A), the distance d2 exceeds the fifth threshold (S702B), and the difference between the speed of the preceding vehicle P having passed through the maximum speed increase point 122 and the maximum speed before increase at the maximum speed increase point 122 exceeds the sixth threshold (S702C), the passing restraint determination unit 14*a* does not establish the second determination flag (S702E).

Figure 10:
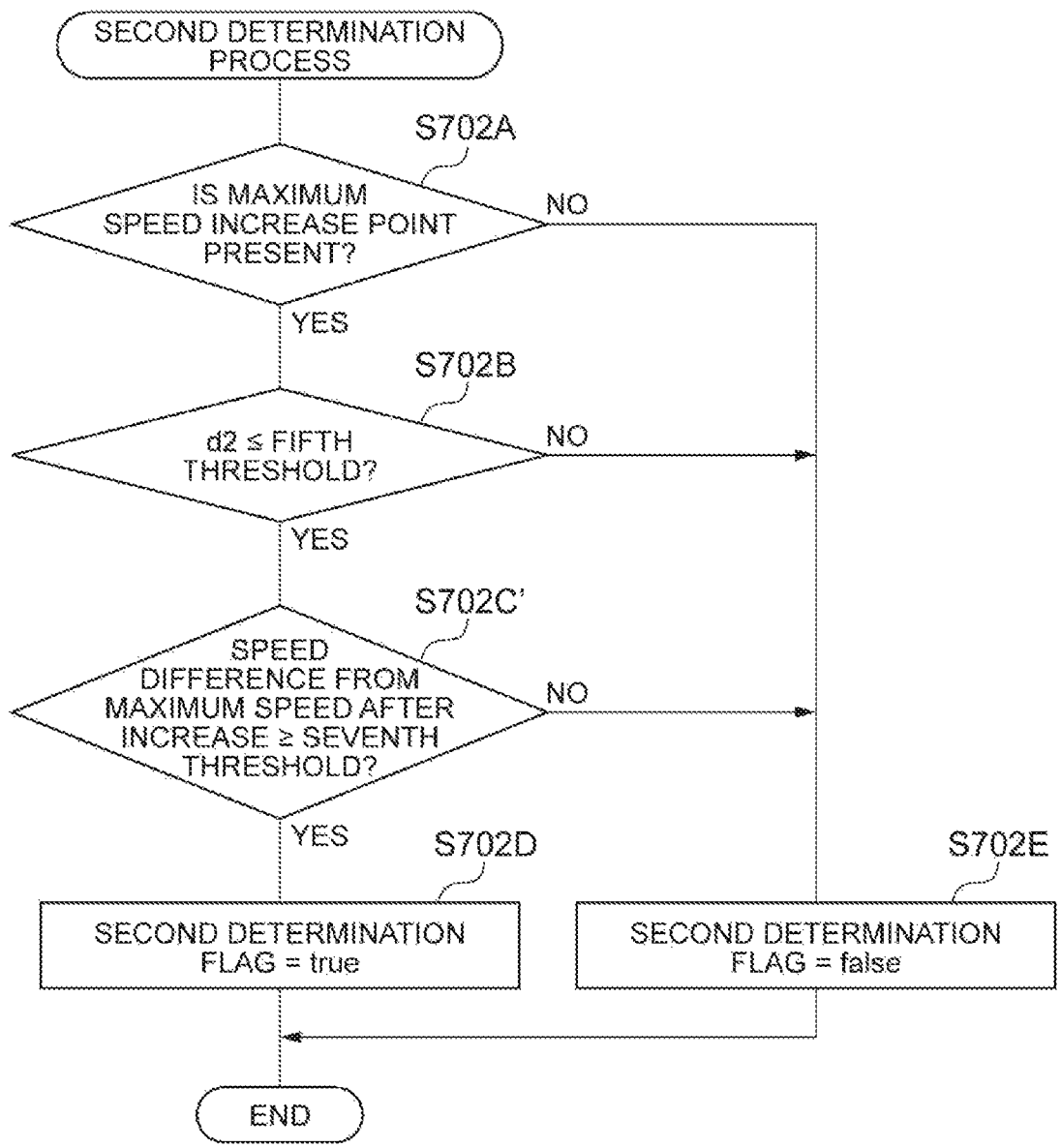
FIG. 10 is a flow diagram illustrating another example of the second determination process of FIG. 3.

In addition, as shown in FIG. 10, when the maximum speed increase point 122 is present (S702A) and the distance d2 is equal to or less than the fifth threshold (S702B), the passing restraint determination unit 14*a* may determine whether a difference between the speed of the preceding vehicle P having passed through the maximum speed increase point 122 and the maximum speed after increase at the maximum speed increase point 122 is equal to or greater than a seventh threshold (S702C'). The seventh threshold is a threshold of a speed difference for determining whether the preceding vehicle P has passed through the maximum speed increase point 122 and then has terminated acceleration.

When the maximum speed increase point 122 is present (S702A), the distance d2 is equal to or less than the fifth threshold (S702B), and the difference between the speed of the preceding vehicle P having passed through the maximum speed increase point 122 and the maximum speed after increase at the maximum speed increase point 122 is equal to or greater than the seventh threshold (S702C'), the passing restraint determination unit 14*a* establishes the second determination flag (S702D). On the other hand, when the maximum speed increase point 122 is not present (S702A), the distance d2 exceeds the fifth threshold (S702B), and the difference between the speed of the preceding vehicle P having passed through the maximum speed increase point 122 and the maximum speed after increase at the maximum speed increase point 122 exceeds the seventh threshold (S702C), the passing restraint determination unit 14*a* does not establish the second determination flag (S702E).

When both the processes of S702C and S702C' are performed, the maximum speed increase point 122 is present (S702A), the distance d2 is equal to or less than the fifth threshold (S702B), the difference between the speed of the preceding vehicle P having passed through the maximum speed increase point 122 and the maximum speed before increase at the maximum speed increase point 122 is equal to or less than the sixth threshold (S702C), and the difference between the speed of the preceding vehicle P having passed through the maximum speed increase point 122 and the maximum speed after increase at the maximum speed increase point 122 is equal to or greater than the seventh threshold (S702C'), the passing restraint determination unit 14*a* may establish the second determination flag (S702D).

Meanwhile, the sixth threshold and the seventh threshold may be set to fluctuating values. For example, the sixth threshold and the seventh threshold may be set in accordance with a difference between the maximum speed before increase at the maximum speed increase point 122 and the maximum speed after increase at the maximum speed increase point 122. For example, as the difference between the maximum speed before increase at the maximum speed increase point 122 and the maximum speed after increase at the maximum speed increase point 122 becomes larger, the sixth threshold may be set to have a larger value, and the seventh threshold may be set to have a smaller value. In addition, the sixth threshold and the seventh threshold may be set in accordance with the maximum speed before increase at the maximum speed increase point 122 or the maximum speed after increase at the maximum speed increase point 122. Alternatively, the sixth threshold and the seventh threshold may be set on the basis of statistical data or information processing of the behavior of other vehicles at the maximum speed increase point 122.

In the example of the second determination process based on the processes of S702A to S702C, S702D, S702E and S702A to S702C', S702D, and S702E, in addition to an effect of the example of the second determination process based on the processes of S702*a* to S702*d*, since it is determined whether the preceding vehicle P has passed through the maximum speed increase point 122 and then has terminated acceleration, from the difference between the speed of the preceding vehicle P and the maximum speed before increase at the maximum speed increase point 122, it is possible to reduce the frequency of excessive restraint such as restraint of passing of the preceding vehicle P in which acceleration has already been completed.

Meanwhile, in the second determination process, the same process may be performed at a point at which the speed of traffic flow of other vehicles in the vicinity of the host vehicle V and the preceding vehicle P increases, instead of the above maximum speed increase point 122. The speed of traffic flow can be acquired through vehicle-to-vehicle communication between the host vehicle V and other vehicles, or road-to-vehicle communication between the host vehicle and a roadside facility capable of detecting the behavior of other vehicles. In addition, the speed of traffic flow can be estimated from the association of the speeds of a plurality of other vehicles with each other for each position of the map data of the map database 4, the average value of the speeds of a plurality of other vehicles in front of the host vehicle V detected by the external sensor 1, or the like.

(Third Determination Process)

Figure 11:
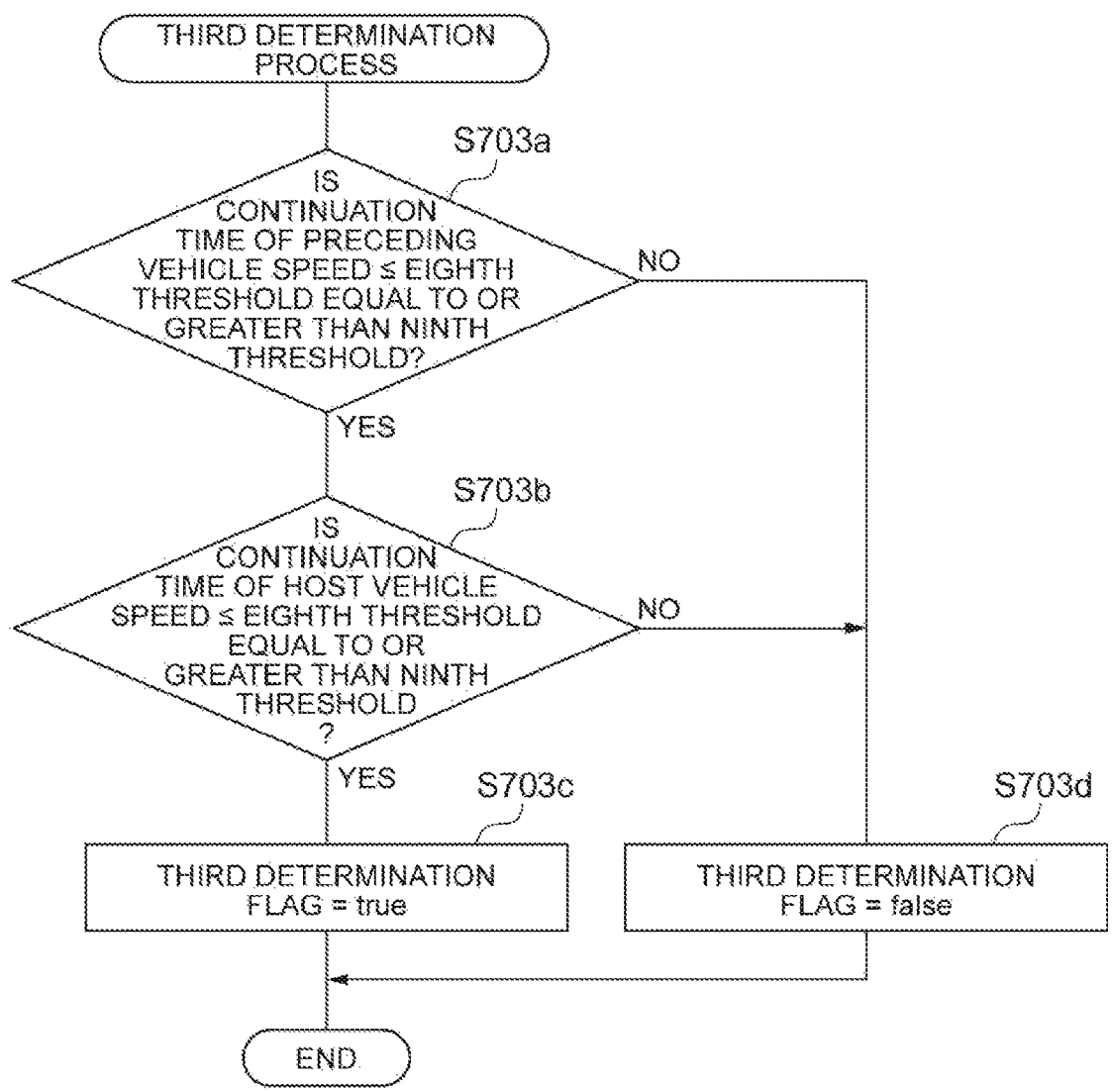
FIG. 11 is a flow diagram illustrating an example of a third determination process of FIG. 3.

Hereinafter, the third determination process in S703 of FIG. 3 will be described. In the third determination process, when the preceding vehicle P, or the preceding vehicle P and host vehicle V travel along the traveling lane 101 in which a traffic jam is occurring, and there is concern of the host vehicle V disturbing a traffic flow in the vicinity of the host vehicle V by performing an operation of passing during a traffic jam, the passing restraint flag is established by establishing the third determination flag. As shown in FIG. 11, the passing restraint determination unit 14*a* determines whether a time for which a state where the speed of the preceding vehicle P is equal to or less than an eighth threshold continues is equal to or greater than a ninth threshold (S703*a*).

The eighth threshold is a threshold of a speed for determining whether the preceding vehicle P travels along the traveling lane 101 in which a traffic jam is occurring. The eighth threshold can be set to, for example, 20 [km/h] when the traveling lane 101 is included in an ordinary road, and can be set to 40 [km/h] when the traveling lane 101 is included in an expressway. In addition, the ninth threshold is a threshold of a time for determining whether the preceding vehicle P travels along the traveling lane 101 in which a traffic jam is occurring.

When the time for which a state where the speed of the preceding vehicle P is equal to or less than the eighth threshold continues is equal to or greater than the ninth threshold (S703*a*), the passing restraint determination unit 14*a* determines whether a time for which a state where the speed of the host vehicle V is equal to or less than the eighth threshold continues is equal to or greater than the ninth threshold (S703*b*). When the time for which a state where the speed of the preceding vehicle P is equal to or less than the eighth threshold continues is equal to or greater than the ninth threshold (S703a) and the time for which a state where the speed of the host vehicle V is equal to or less than the eighth threshold continues is equal to or greater than the ninth threshold (S703b), the passing restraint determination unit 14a establishes the third determination flag (S703c). On the other hand, when the time for which a state where the speed of the preceding vehicle P is equal to or less than the eighth threshold continues is not equal to or greater than the ninth threshold (S703a) and the time for which a state where the speed of the host vehicle V is equal to or less than the eighth threshold continues is not equal to or greater than the ninth threshold (S703b), the passing restraint determination unit 14a does not establish the third determination flag (S703d). That is, when the speed of the preceding vehicle P exceeds the eighth threshold, the time for which a state where the speed of the preceding vehicle P is equal to or less than the eighth threshold continues is less than the ninth threshold, the speed of the host vehicle V exceeds the eighth threshold, and the time for which a state where the speed of the host vehicle V is equal to or less than the eighth threshold continues is less than the ninth threshold, the passing restraint determination unit 14a does not establish the third determination flag.

Meanwhile, the process of S703b may be omitted. In this case, the passing restraint determination unit 14a establishes the third determination flag (S703c) when the time for which a state where the speed of the preceding vehicle P is equal to or less than the eighth threshold continues is equal to or greater than the ninth threshold (S703a), and does not establish the third determination flag (S703d) when the time for which a state where the speed of the preceding vehicle P is equal to or less than the eighth threshold continues is not equal to or greater than the ninth threshold (S703a).

In addition, the process of S703a is performed on the basis of the speed of the preceding vehicle P recognized by the preceding vehicle recognition unit 11 using the external sensor 1, but immediacy is high, and thus the accuracy of the process is enhanced. However, in the process of S703a, traffic jam information is acquired through road-to-vehicle communication with a roadside facility constituting a traffic jam monitoring system, and the process may be performed on the basis of the speed of the preceding vehicle P which is estimated from the acquired traffic jam information. In addition, the process of S703a may be performed on the basis of the speed of the preceding vehicle P acquired through vehicle-to-vehicle communication with the preceding vehicle P. In addition, the process of S703a may be performed on the basis of the speed of the preceding vehicle P which is estimated through vehicle-to-vehicle communication vehicles other than the preceding vehicle P.

In the example of the third determination process based on the processes of S703a to S703d and the processes of S703a, S703c, and S703d, when the preceding vehicle P, or the preceding vehicle P and host vehicle V travel along the traveling lane 101 in which a traffic jam is occurring, and there is concern of the host vehicle V disturbing a traffic flow in the vicinity of the host vehicle V by performing an operation of passing during a traffic jam, the passing restraint flag is established by establishing the third determination flag, and thus it is possible to reduce the occurrence of an inappropriate operation of passing.

(Fourth Determination Process)

Figure 12:
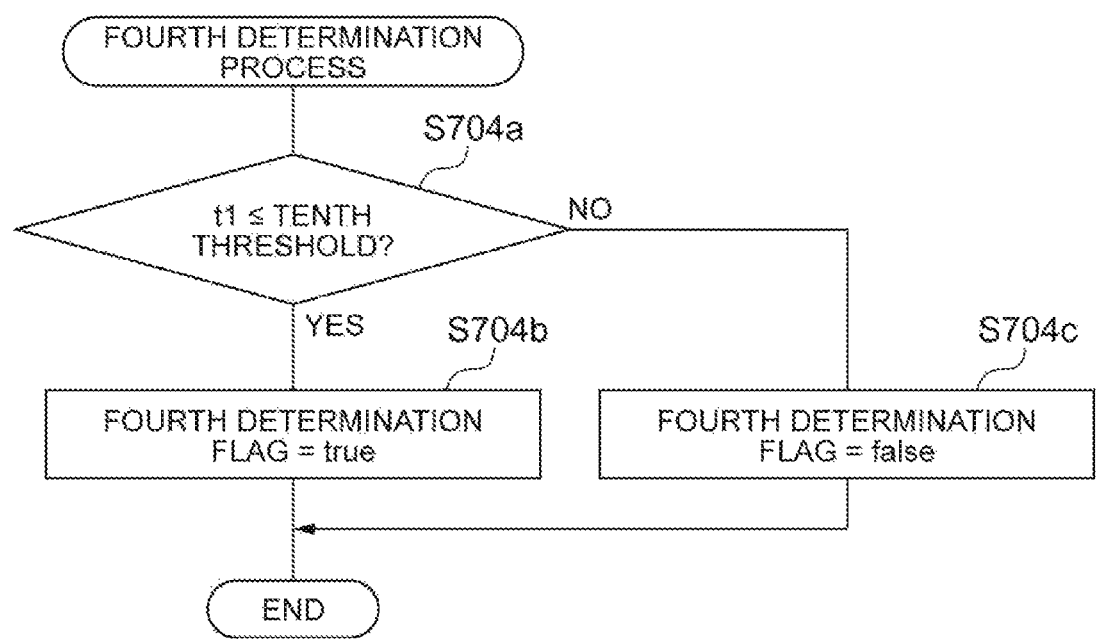
FIG. 12 is a flow diagram illustrating an example of a fourth determination process of FIG. 3.
Figure 13:
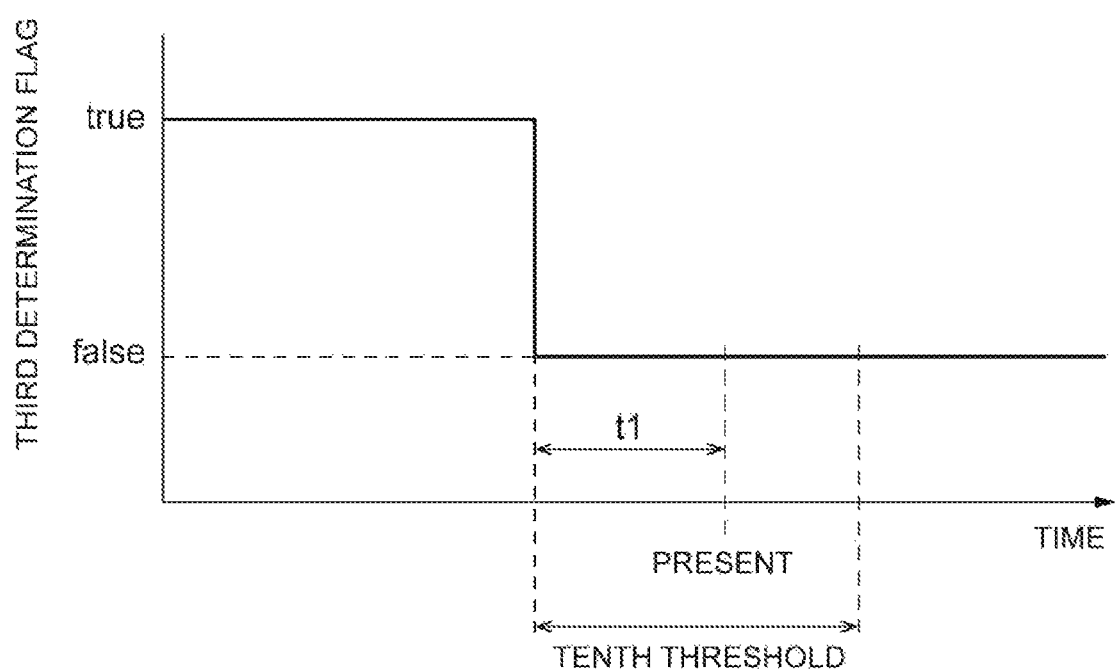
FIG. 13 is a graph illustrating a case of conversion from a state where a third determination flag is established to a state where the flag is not established.

Hereinafter, the fourth determination process in S704 of FIG. 3 will be described. In the fourth determination process, when it is predicted that, immediately after the preceding vehicle P has escaped from a traffic jam, the preceding vehicle P accelerates and the relative speed decreases, the passing restraint flag is established by establishing the fourth determination flag. As shown in FIGS. 12 and 13, the passing restraint determination unit 14a determines whether a time t1 elapsed after a state where the third determination flag is not established from a state where the third determination flag is established is equal to or less than a tenth threshold (S704a). That is, the passing restraint determination unit 14a determines whether a time elapsed after a state where the speed of the preceding vehicle P exceeds the eighth threshold from a state where a time for which a state where the speed of the preceding vehicle P is equal to or less than the eighth threshold continues is equal to or greater than the ninth threshold is equal to or less than a tenth threshold.

The tenth threshold is a threshold of a time for determining whether the preceding vehicle P has escaped from a traffic jam and then has terminated acceleration. Meanwhile, the time t1 may be calculated by dividing the speed of the preceding vehicle P into the traveling distance of the preceding vehicle P after a state where the third determination flag is not established from a state where the third determination flag is established. In addition, the determination of whether the preceding vehicle P has escaped from a traffic jam and then has terminated acceleration may be performed depending on whether the traveling distance of the preceding vehicle P after a state where the third determination flag is not established from a state where the third determination flag is established is equal to or greater than an arbitrary threshold.

When the time t1 elapsed after a state where the third determination flag is not established from a state where the third determination flag is established is equal to or less than the tenth threshold (S704a), the passing restraint determination unit 14a establishes the fourth determination flag (S704b). On the other hand, when the time t1 elapsed after a state where the third determination flag is not established from a state where the third determination flag is established exceeds the tenth threshold (S704a), the passing restraint determination unit 14a does not establish the fourth determination flag (S704c).

Meanwhile, in the process of S704a, the determination of whether a state where the third determination flag is established has been converted into a state where the third determination flag is not established, that is, the determination of whether a state where the time for which a state where the speed of the preceding vehicle P is equal to or less than the eighth threshold continues is equal to or greater than the ninth threshold is converted into a state where the speed of the preceding vehicle P exceeds the eighth threshold is performed on the basis of the speed of the preceding vehicle P recognized by the preceding vehicle recognition unit 11 using the external sensor 1, but immediacy is high, and thus the accuracy of the process is enhanced. In addition, even when the process of S704a is performed on the basis of the speed of the preceding vehicle P acquired through vehicle-to-vehicle communication with the preceding vehicle P, immediacy is high, and thus it is possible to enhance the accuracy of the process.

In the example of the fourth determination process based on the processes of S704a to S704c, when it is predicted that, immediately after the preceding vehicle P has escaped from a traffic jam, the preceding vehicle P accelerates and the relative speed decreases, the passing restraint flag is established by establishing the fourth determination flag, and thus it is possible to reduce the occurrence of an inappropriate operation of passing.

(Fifth Determination Process)

Figure 14:
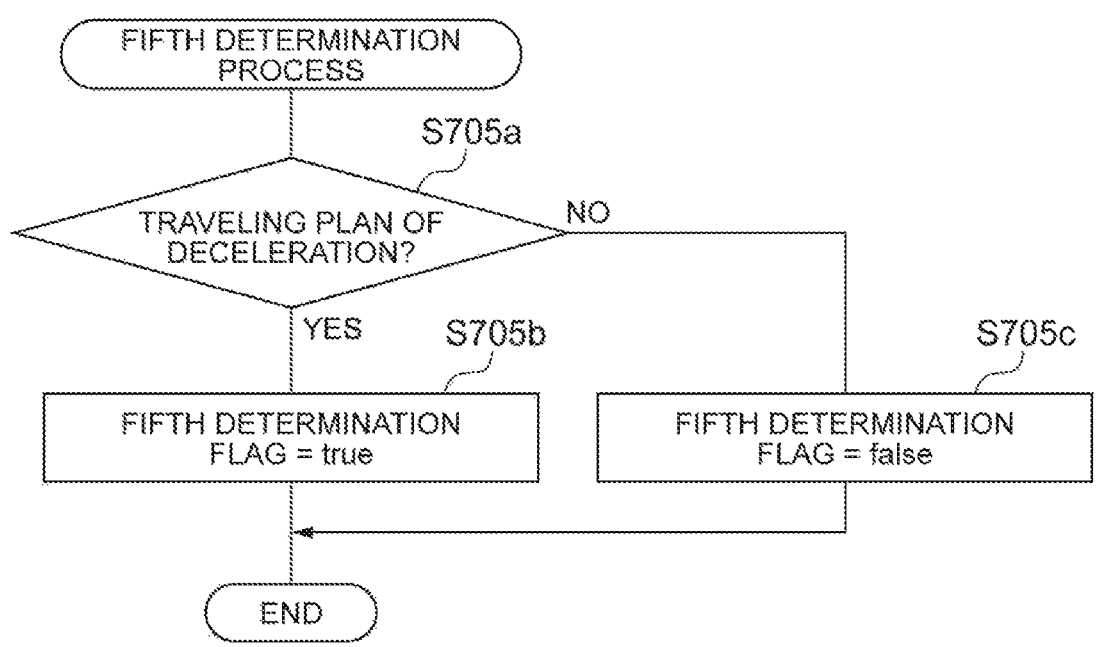
FIG. 14 is a flow diagram illustrating an example of a fifth determination process of FIG. 3.

Hereinafter, the fifth determination process in S705 of FIG. 3 will be described. In the fifth determination process, when it is predicted that the host vehicle V decelerates and the relative speed decreases, the passing restraint flag is established by establishing the fifth determination flag. As shown in FIG. 14, the passing restraint determination unit 14a determines whether the traveling plan generation unit 15 generates a traveling plan to decelerate the host vehicle V (S705a). The passing restraint determination unit 14a acquires, for example, information relating to the speed or deceleration of the host vehicle V for each arbitrary time of the traveling plan generated by the traveling plan generation unit 15, thereby allowing the deceleration of the host vehicle V after a few seconds to be predicted.

A case where the traveling plan generation unit 15 generates a traveling plan to decelerate the host vehicle V is, for example, a case a curve or an obstacle is present in the traveling lane 101 in front of the host vehicle V. For example, the traveling plan generation unit 15 acquires the curvature of the traveling lane 101 in front of the host vehicle V from the map information of the map database 4 and the position of the host vehicle V based on the GPS receiving unit 2, and calculates the upper limit of a speed observed by the host vehicle V from the curvature. In addition, the traveling plan generation unit 15 calculates the upper limit of a speed observed by the host vehicle V from a physical equation, using the curvature and the maximum lateral acceleration or maximum lateral jerk, set in advance, of the host vehicle V which is capable of being allowed. Therefore, when the calculated upper limit of a speed observed by the host vehicle V is slower than the current speed of the host vehicle V, the traveling plan generation unit 15 generates a traveling plan to decelerate the host vehicle V.

In addition, a case where the traveling plan generation unit 15 generates a traveling plan to decelerate the host vehicle V is a case where a maximum speed decrease point at which the maximum speed, stipulated by laws and ordinances, of the traveling lane 101 decreases is present in the traveling lane 101 in front of the host vehicle V. A case where the traveling plan generation unit 15 generates a traveling plan to decelerate the host vehicle V is a case where such a traffic jam as that in which the third determination flag is established occurs in the traveling lane 101 in front of the host vehicle V. The determination of whether a traffic jam occurs can be performed on the basis of the speed of the preceding vehicle P similarly to the above fifth determination process. In addition, the determination of whether a traffic jam occurs may be performed depending on whether the deceleration of the preceding vehicle P is equal to or greater than an arbitrary threshold in addition to the speed of the preceding vehicle P, and may be performed on the basis of the speeds or deceleration of vehicles other than the preceding vehicle P.

When the traveling plan generation unit 15 generates a traveling plan to decelerate the host vehicle V (S705a), the passing restraint determination unit 14a establishes the fifth determination flag (S705b). On the other hand, when the traveling plan generation unit 15 does not generate a traveling plan to decelerate the host vehicle V (S705a), the passing restraint determination unit 14a does not establish the fifth determination flag (S705c).

In the example of the fifth determination process based on the processes of S705a to S705c, when it is predicted that the host vehicle V decelerates and the relative speed decreases, the passing restraint flag is established by establishing the fifth determination flag, and thus it is possible to reduce the occurrence of an inappropriate operation of passing.

Hereinafter, another example of the fifth determination process will be described. In the fifth determination process described below, the passing restraint determination unit 14a determines whether a predicted relative speed between the preceding vehicle P when the host vehicle V comes close to the preceding vehicle P and the host vehicle V after deceleration based on the traveling plan is less than the second threshold. That is, even after the host vehicle V is decelerated based on the traveling plan, the passing request flag is established by the passing request determination unit 13, and it is predicted whether the preceding vehicle P is a target for an operation of passing.

Figure 15:
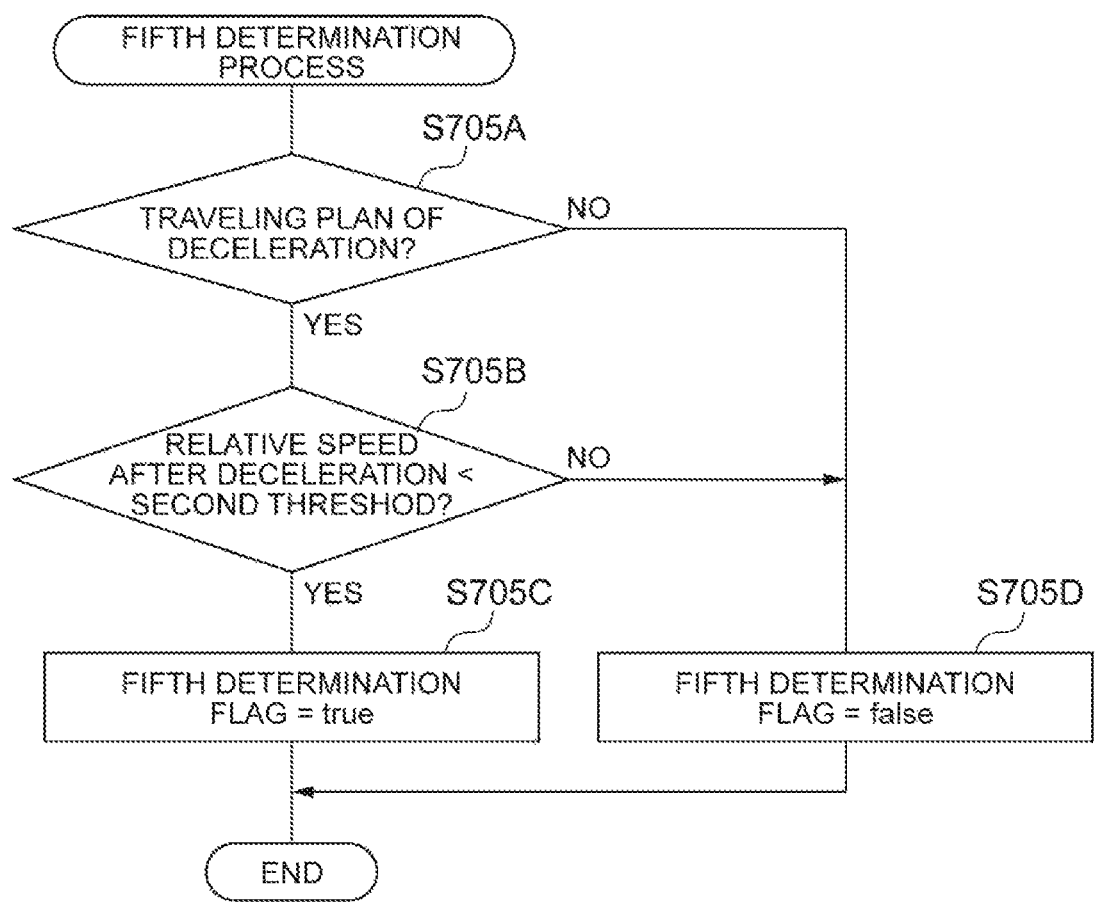
FIG. 15 is a flow diagram illustrating another example of the fifth determination process of FIG. 3.

As shown in FIG. 15, similarly to S705a, the passing restraint determination unit 14a determines whether the traveling plan generation unit 15 generates a traveling plan to decelerate the host vehicle V (S705A). When the traveling plan generation unit 15 generates a traveling plan to decelerate the host vehicle V (S705A), the passing restraint determination unit 14a determines whether a predicted relative speed between the preceding vehicle P when the host vehicle V comes close to the preceding vehicle P and the host vehicle V after deceleration based on the traveling plan is less than the second threshold (S705B).

When the traveling plan generation unit 15 generates a traveling plan to decelerate the host vehicle V (S705A), and a predicted relative speed between the preceding vehicle P when the host vehicle V comes close to the preceding vehicle P and the host vehicle V after deceleration based on the traveling plan is less than the second threshold (S705B), the passing restraint determination unit 14a establishes the fifth determination flag (S705C). On the other hand, when the traveling plan generation unit 15 does not generate a traveling plan to decelerate the host vehicle V (S705A), and a predicted relative speed between the preceding vehicle P when the host vehicle V comes close to the preceding vehicle P and the host vehicle V after deceleration based on the traveling plan is equal to or greater than the second threshold (S705B), the passing restraint determination unit 14a does not establish the fifth determination flag (S705D).

In the example of the fifth determination process based on the processes of S705A to S705D, in addition to an effect of the example of the fifth determination process based on the processes of S705a to S705c, even after the host vehicle V is decelerated based on the traveling plan, the passing request flag is established by the passing request determination unit 13, and it is predicted whether the preceding vehicle P is a target for an operation of passing. Therefore, it is possible to reduce the frequency of excessive restraint such as restraint of passing when the relative speed is sufficient large. However, the fifth determination process based on the processes of S705A to S705D is not necessarily required, and only the processes of the S705a to S705c may be performed.

According to the first embodiment, the passing restraint flag for restraining the host vehicle V from passing the preceding vehicle P ahead is established by the passing restraint determination unit 14a of the vehicle control device 100a. In addition, when the passing restraint flag is established by the traveling plan generation unit 15 of the vehicle control device 100a, a traveling plan for the host vehicle V not to pass the preceding vehicle P ahead is generated. The passing restraint determination unit 14a establishes the passing restraint flag when there is the possibility of an inappropriate operation of passing occurring such as when a distance between the merging points 111a and 111b of the traveling lane 101 along which the host vehicle V travels and the merging lane 102 merging into the traveling lane 101, and the position of the preceding vehicle P having passed through the merging points 111a and 111b is equal to or less than the third threshold. Thereby, it is possible to reduce the occurrence of an inappropriate operation of passing.

That is, when an operation of passing becomes appropriate during the operation of passing, an inappropriate lane change or the like is performed by an occupant of the host vehicle V, and thus the occupant of the host vehicle V feels inconvenience. In the situation where the passing restraint flag is established by the first determination process (S701) to the fifth determination process (S705), it can be inevitably predicted that the operation of passing becomes inappropriate within a few seconds to several tens of seconds from before the start of the operation of passing and after the start of the operation of passing. Consequently, in the first embodiment, it is possible to eliminate the occurrence of a sense of discomfort of causing an occupant to perform an inappropriate lane change or the like.

Meanwhile, in the first determination process (S701) to the fifth determination process (S705) of FIG. 3, all of the first determination process (S701) to the fifth determination process (S705) are not necessarily performed, and a single and a plurality of processes selected from the first determination process (S701) to the fifth determination process (S705) may be performed. In this case, the preceding vehicle recognition unit 11 and the road information acquisition unit 12 does not need to acquire information for processes which are not performed, and the information for processes which are not performed does not need to be stored in the map database 4.

Second Embodiment

Figure 16:
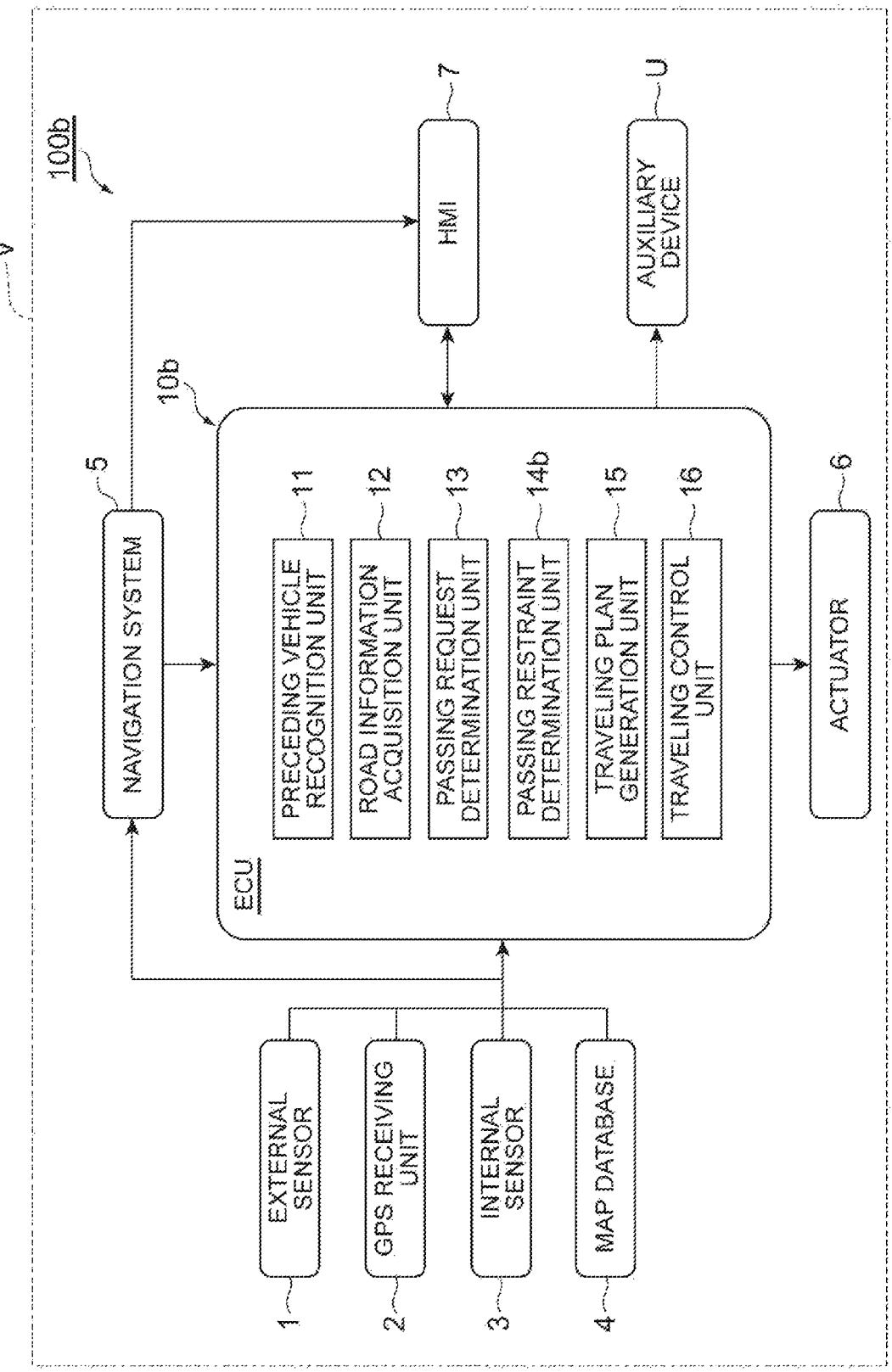
FIG. 16 is a block diagram illustrating a configuration of a vehicle control device according to a second embodiment.
Figure 17:
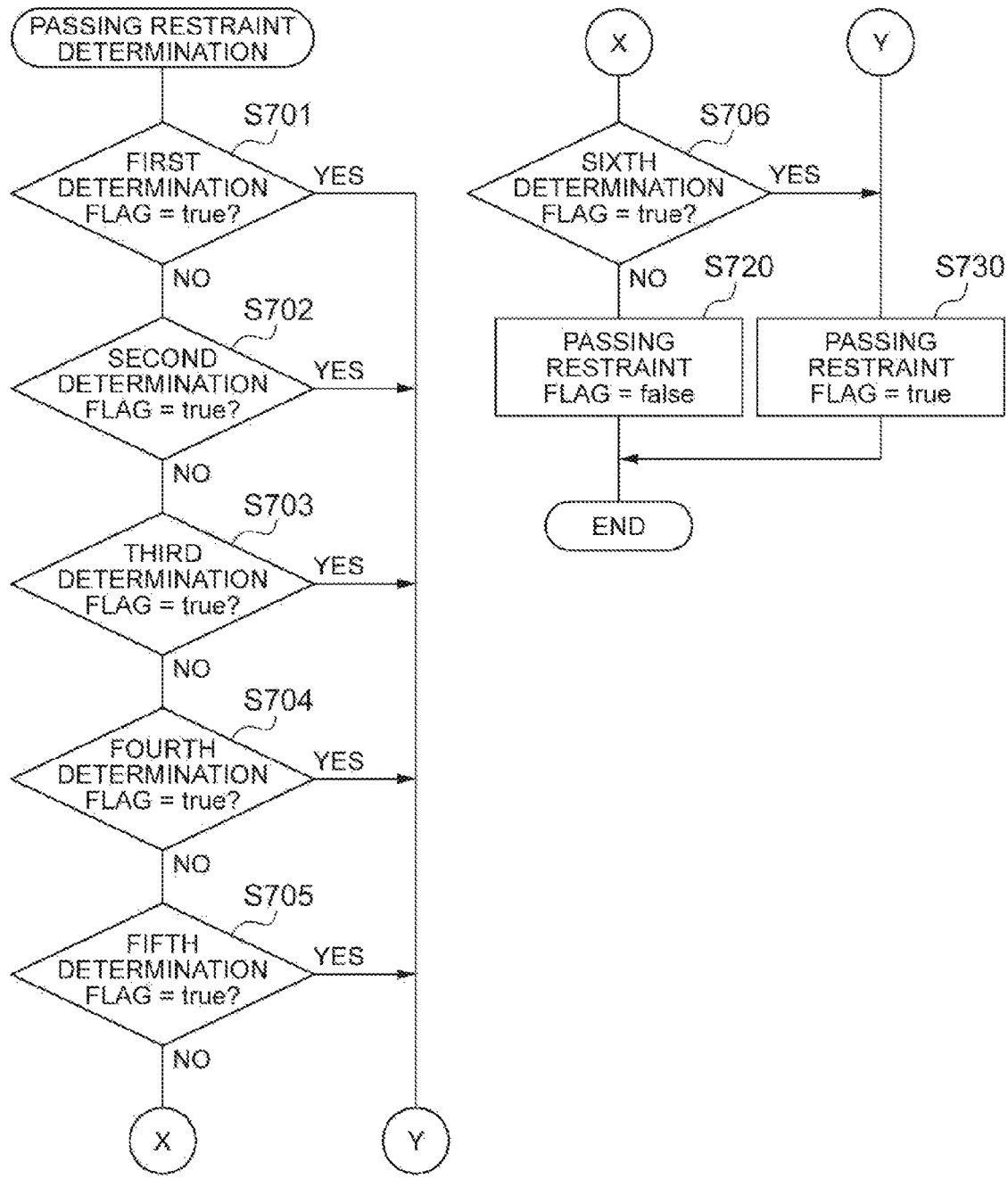
FIG. 17 is a flow diagram illustrating a passing restraint determination process in the second embodiment of FIG. 2.

Hereinafter, a second embodiment of the present invention will be described. As shown in FIG. 16, a vehicle control device 100b of the present embodiment includes an ECU 10b instead of the ECU 10a of the first embodiment. The ECU 10b includes a passing restraint determination unit 14b instead of the passing restraint determination unit 14a of the first embodiment. As shown in FIG. 17, in the passing restraint determination process in S7 of FIG. 2, the passing restraint determination unit 14b of the present embodiment performs a sixth determination process (S706) in addition to the first determination process (S701) to the fifth determination process (S705). When the first determination flag is not established in the first determination process (S701), the second determination flag is not established in the second determination process (S702), the third determination flag is not established in the third determination process (S703), the fourth determination flag is not established in the fourth determination process (S704), the fifth determination flag is not established in the fifth determination process (S705), and a sixth determination flag is not established in the sixth determination process (S706), the passing restraint determination unit 14b does not establish the passing restraint flag (S720).

On the other hand, when the first determination flag is established in the first determination process (S701), the second determination flag is established in the second determination process (S702), the third determination flag is established in the third determination process (S703), the fourth determination flag is established in the fourth determination process (S704), the fifth determination flag is established in the fifth determination process (S705), and the sixth determination flag is established in the sixth determination process (S706), the passing restraint determination unit 14b establishes the passing restraint flag (S730). Hereinafter, the details of the sixth determination process (S706) will be described.

(Sixth Determination Process)

Hereinafter, the sixth determination process in S706 of FIG. 17 will be described. In the sixth determination process, an inter-vehicle distance between the preceding vehicle P and the host vehicle V is short, and the absolute value of the deceleration of the preceding vehicle P is large. Therefore, where there are the possibility of interfering with a traffic flow in the vicinity of the host vehicle V and the possibility of being associated with a sudden change in the traveling state of the host vehicle V, the passing restraint flag is established by establishing the sixth determination flag. A case where the absolute value of the deceleration of the preceding vehicle P is large is, for example, a case where it is predicted that obstacles such as other faulty vehicles and other vehicles of a low speed are present in front of the preceding vehicle P, the rapid deceleration of the preceding vehicle P is performed, or the deceleration of the preceding vehicle continues over a long period of time.

Figure 18:
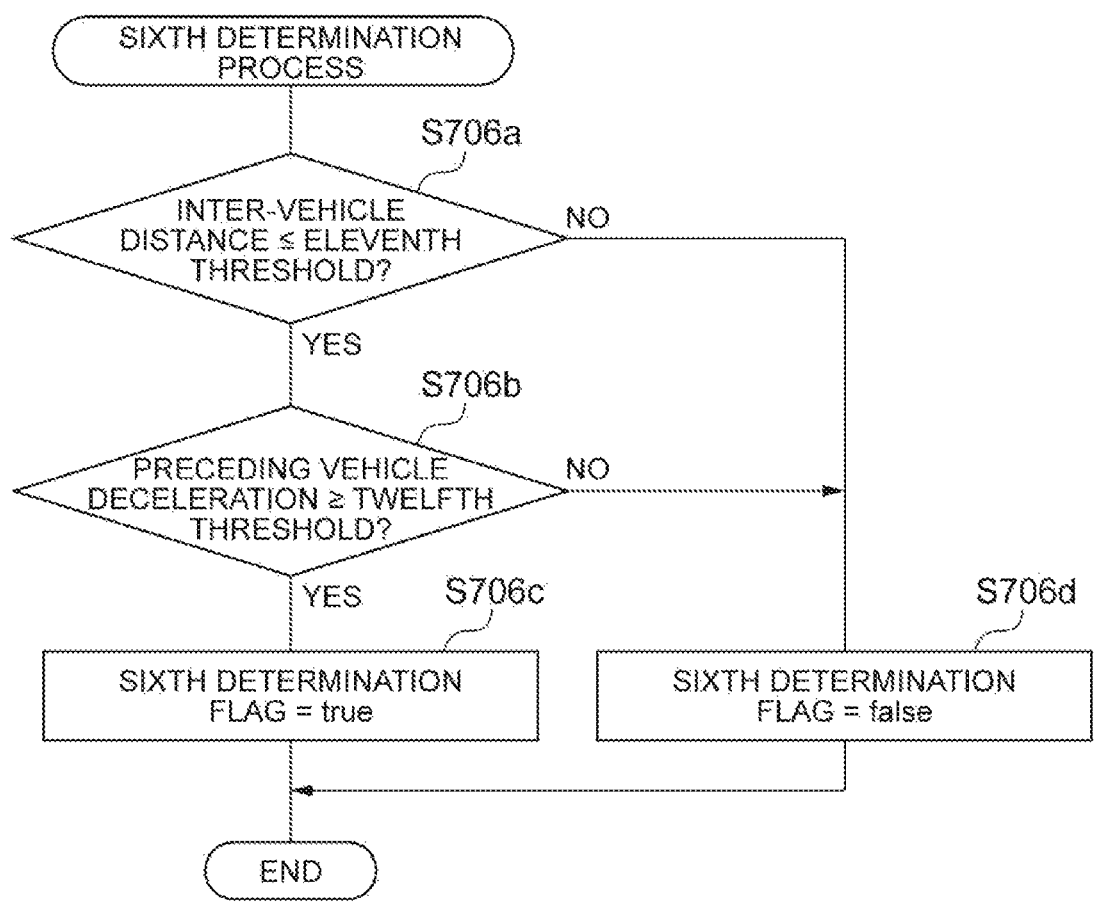
FIG. 18 is a flow diagram illustrating an example of a sixth determination process of FIG. 17.

As shown in FIG. 18, the passing restraint determination unit 14b determines whether the inter-vehicle distance between the preceding vehicle P and the host vehicle V is equal to or less than an eleventh threshold (S706a). The eleventh threshold is a threshold of an inter-vehicle distance for determining whether the host vehicle V is greatly influenced when the rapid deceleration of the preceding vehicle P is performed. When the inter-vehicle distance is sufficient long, an operation of passing including a lane change can be performed in a state of a sufficient long inter-vehicle distance even though the rapid deceleration of the preceding vehicle P is performed. In addition, when the inter-vehicle distance is sufficient long, an operation of passing can be performed without the rapid deceleration or sudden turn of the host vehicle V even though the rapid deceleration of the preceding vehicle P is performed. Consequently, in the process of S706a, it is determined whether the inter-vehicle distance is sufficient long. Meanwhile, the eleventh threshold may be set to have a larger value as the speed of the host vehicle V becomes higher.

Meanwhile, the inter-vehicle distance may be expressed by an inter-vehicle time which will be taken until the preceding vehicle P passes through a certain position and then the host vehicle V passes through the position. Alternatively, the inter-vehicle distance may be expressed by a time to collision (TTC) that is a time which will be taken until the preceding vehicle P and the host vehicle V come into contact with each other.

When the inter-vehicle distance between the preceding vehicle P and the host vehicle V is equal to or less than the eleventh threshold (S706a), the passing restraint determination unit 14b determines whether the absolute value of the deceleration of the preceding vehicle P is equal to or greater than a twelfth threshold (S706b). The twelfth threshold is a threshold of deceleration for determining whether the preceding vehicle P performs rapid deceleration through deceleration different from deceleration used in normal traveling. The twelfth threshold can be set to, for example, 0.35 $[G]=3.43$ $[m/s^2]$. Meanwhile, the twelfth threshold may be set to have a smaller value as a time for which the preceding vehicle P decelerates becomes longer. In addition, when other vehicles are present in the vicinity of the host vehicle V and the preceding vehicle P, the twelfth threshold may be set to have a smaller value than when other vehicles are not present in the vicinity of the host vehicle V and the preceding vehicle P.

When the inter-vehicle distance between the preceding vehicle P and the host vehicle V is equal to or less than the eleventh threshold (S706a), and the absolute value of the deceleration of the preceding vehicle P is equal to or greater than the twelfth threshold (S706b), the passing restraint determination unit 14b establishes the sixth determination flag (S706c). On the other hand, when the inter-vehicle distance between the preceding vehicle P and the host vehicle V exceeds the eleventh threshold (S706a), and the absolute value of the deceleration of the preceding vehicle P is less than the twelfth threshold (S706b), the passing restraint determination unit 14b does not establish the sixth determination flag (S706d).

Meanwhile, the inter-vehicle distance between the preceding vehicle P and the host vehicle V is equal to or less than the eleventh threshold (S706a), the absolute value of the deceleration of the preceding vehicle P is equal to or greater than the twelfth threshold (S706b), and obstacles such as other faulty vehicles, other vehicles of a low speed, other vehicles intruding in front of the preceding vehicle P, stationary objects, and structures of walls or the like located on the road are present in the periphery of the preceding vehicle P, the passing restraint determination unit 14b may establish the sixth determination flag (S706c). Information relating to the obstacles in the vicinity of the preceding vehicle P can be acquired through the external sensor 1, the map database 4, vehicle-to-vehicle communication with other vehicles, and road-to-vehicle communication with a roadside facility capable of acquiring information relating to other vehicles.

In addition, when the inter-vehicle distance between the preceding vehicle P and the host vehicle V is equal to or less than the eleventh threshold (S706a), and the absolute value of the deceleration of the preceding vehicle P is equal to or greater than the twelfth threshold (S706b), and the hazard lamp or the brake lamp of the preceding vehicle P is turned on, the passing restraint determination unit 14b may establish the sixth determination flag (S706c). The turn-on state of the hazard lamp, the brake lamp or the like of the preceding vehicle P can be discriminated by the camera of the external sensor 1, or by the preceding vehicle recognition unit 11 using vehicle-to-vehicle communication with the preceding vehicle P.

In addition, when the inter-vehicle distance between the preceding vehicle P and the host vehicle V is equal to or less than the eleventh threshold (S706a), and the speed of the preceding vehicle P is equal to or less than an arbitrary threshold, or the jerk of the preceding vehicle P is equal to or greater than an arbitrary threshold, the passing restraint determination unit 14b may establish the sixth determination flag (S706c).

Further, when the traveling plan generation unit 15 generates a traveling plan for the host vehicle V to perform follow-up traveling while maintaining an inter-vehicle distance from the preceding vehicle P, on the basis of the behavior of the preceding vehicle P, the passing restraint determination unit 14b may establish the sixth determination flag (S706c). Alternatively, when the traveling plan generation unit 15 generates, on the basis of the behavior of the preceding vehicle P, a traveling plan for the host vehicle V to perform deceleration based on deceleration equal to or greater than an arbitrary threshold, a traveling plan for the host vehicle V travels at a speed equal to or less than an arbitrary threshold, a traveling plan in which the inter-vehicle distance between the preceding vehicle P and the host vehicle V is set to be equal to or less than an arbitrary threshold, a traveling plan for the host vehicle V to perform deceleration based on a jerk equal to or greater than an arbitrary threshold, and a traveling plan for the host vehicle V to perform steering based on a steering angle equal to or greater than an arbitrary threshold, the passing restraint determination unit 14b may establish the sixth determination flag (S706c).

In the example of the sixth determination process based on the processes of S706a to S706d of the second embodiment, the inter-vehicle distance between the preceding vehicle P and the host vehicle V is short, and the absolute value of the deceleration of the preceding vehicle P is large. Therefore, when the operation of passing has the possibility of interfering with a traffic flow in the vicinity of the host vehicle V and the possibility of being associated with a sudden change in the traveling state of the host vehicle V, the passing restraint flag is established by establishing the sixth determination flag, and thus it is possible to reduce the occurrence of an inappropriate operation of passing which has the possibility of interfering with a traffic flow in the vicinity of the host vehicle V and the possibility of being associated with a sudden change in the traveling state of the host vehicle V.

That is, for example, the host vehicle V decelerates to a low speed, or performs passing while the host vehicle V performs rapid deceleration, and thus it is possible to reduce a traffic flow of the adjacent lane 103 or the like and a sense of discomfort given to an occupant of the host vehicle V. Meanwhile, in the second embodiment, since a traveling plan for the host vehicle V to perform a lane change other than the operation of passing is generated even when the passing restraint flag is established, a lane change for avoiding an obstacle, a lane change to a branching lane toward a destination, or the like is performed as normal. Therefore, action having high priority such as safety ensuring, law observance, and arrival at a destination is not interfered with.

Meanwhile, in the first determination process (S701) to the fifth determination process (S705) of FIG. 17, all of the first determination process (S701) to the fifth determination process (S705) are not necessarily performed, and a single and a plurality of processes selected from the first determination process (S701) to the fifth determination process (S705) may be performed in combination with the sixth determination process (S706). In this case, the preceding vehicle recognition unit 11 and the road information acquisition unit 12 does not need to acquire information for processes which are not performed, and the information for processes which are not performed does not need to be stored in the map database 4.

Third Embodiment

Figure 19:
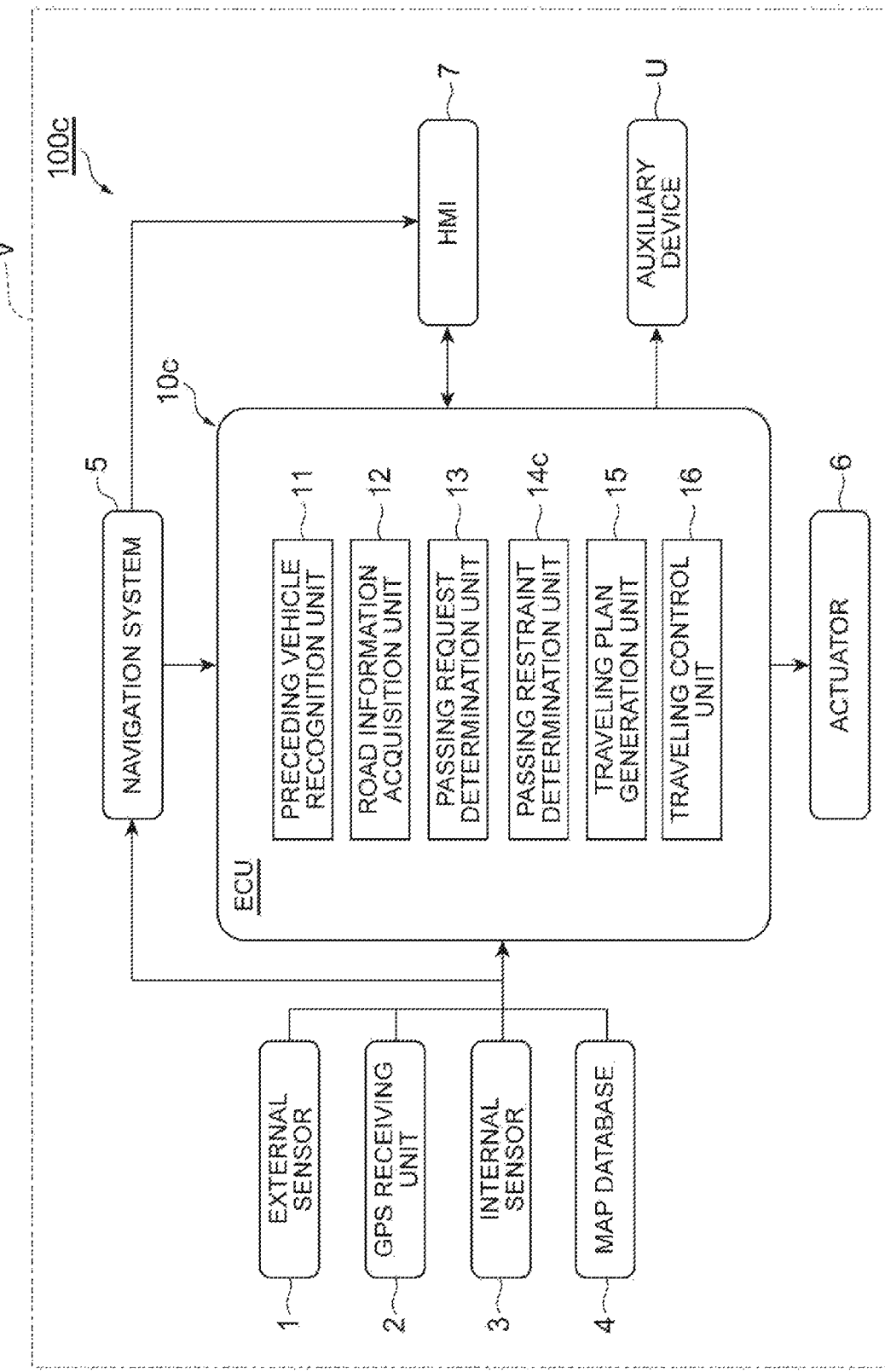
FIG. 19 is a block diagram illustrating a configuration of a vehicle control device according to a third embodiment.
Figure 20:
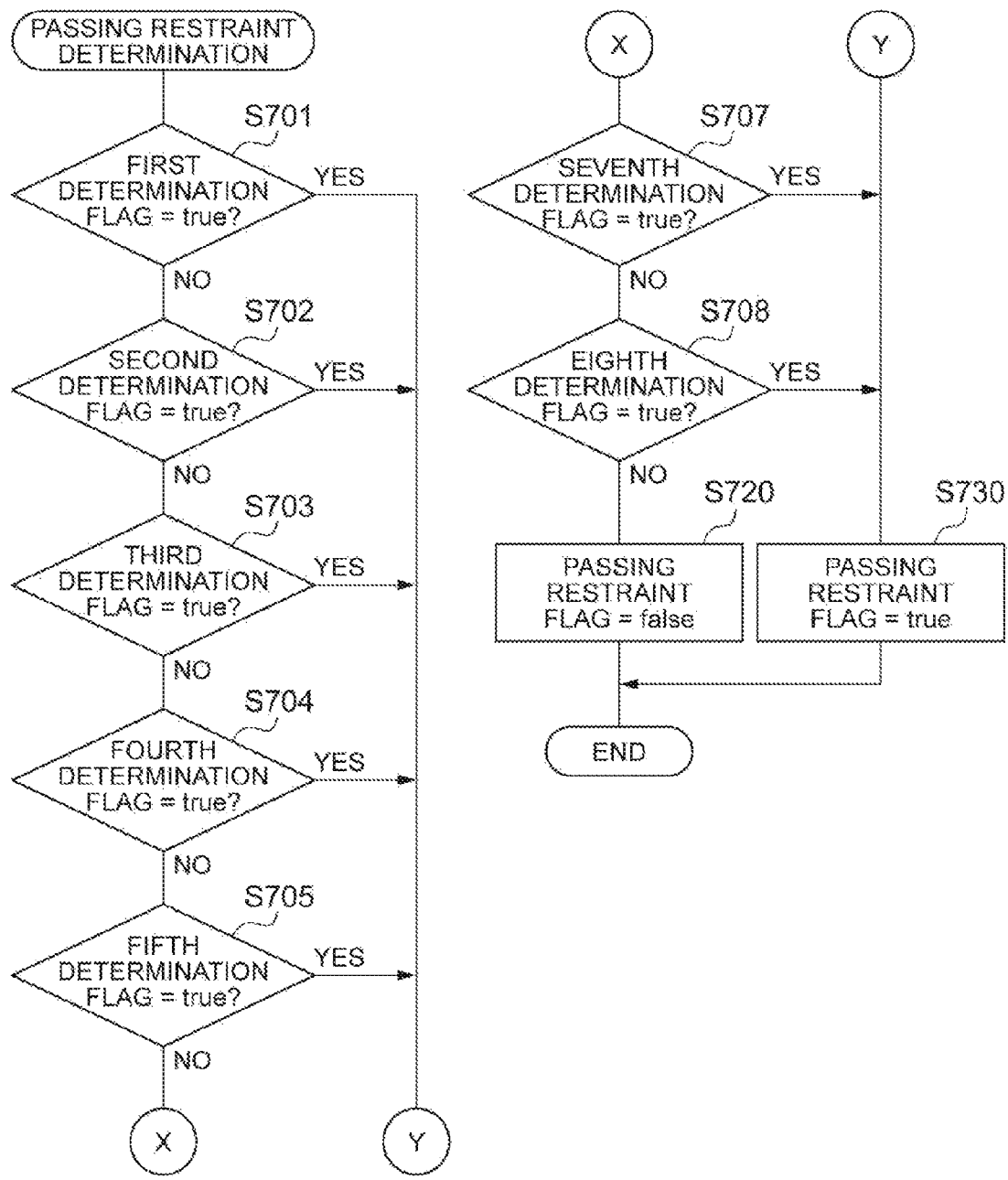
FIG. 20 is a flow diagram illustrating a passing restraint determination process in the third embodiment of FIG. 2.

Hereinafter, a third embodiment of the present invention will be described. As shown in FIG. 19, a vehicle control device 100c of the present embodiment includes an ECU 10c instead of the ECU 10a of the first embodiment. The ECU 10c includes a passing restraint determination unit 14c instead of the passing restraint determination unit 14a of the first embodiment. As shown in FIG. 20, in the passing restraint determination process in S7 of FIG. 2, the passing restraint determination unit 14c of the present embodiment performs a seventh determination process (S707) and an eighth determination process (S708) in addition to the first determination process (S701) to the fifth determination process (S705). When the first determination flag is not established in the first determination process (S701), the second determination flag is not established in the second determination process (S702), the third determination flag is not established in the third determination process (S703), the fourth determination flag is not established in the fourth determination process (S704), the fifth determination flag is not established in the fifth determination process (S705), a seventh determination flag is not established in the seventh determination process (S707), and an eighth determination flag is not established in the eighth determination process (S708), the passing restraint determination unit 14c does not establish the passing restraint flag (S720).

On the other hand, when the first determination flag is established in the first determination process (S701), the second determination flag is established in the second determination process (S702), the third determination flag is established in the third determination process (S703), the fourth determination flag is established in the fourth determination process (S704), the fifth determination flag is established in the fifth determination process (S705), the seventh determination flag is established in the seventh determination process (S707), and the eighth determination flag is established in the eighth determination process (S708), the passing restraint determination unit 14c establishes the passing restraint flag (S730). Hereinafter, the details of the seventh determination process (S707) and the eighth determination process (S708) will be described.

(Seventh Determination Process)

Hereinafter, the seventh determination process in S707 of FIG. 20 will be described. In the seventh determination process, when the passing request flag is established with respect to the preceding vehicle P which is a target for the operation of passing in which the passing request flag is established by the passing request determination unit 13, and then it is predicted that, within a fixed period of time, the preceding vehicle P moves from the traveling lane 101 along which the host vehicle V and the preceding vehicle P travel to the adjacent lane 103, the passing restraint flag is established by establishing the seventh determination flag.

Figure 21:
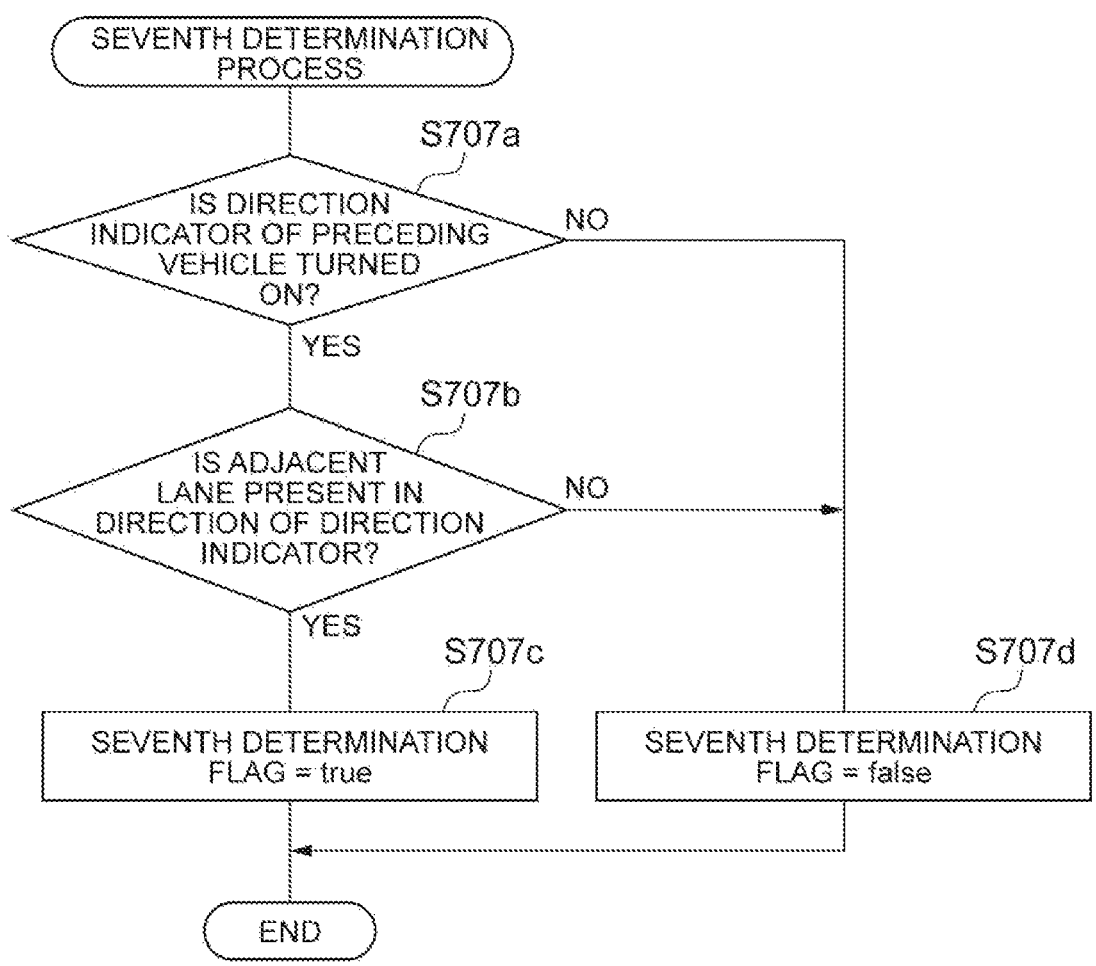
FIG. 21 is a flow diagram illustrating an example of a seventh determination process of FIG. 20.
Figure 22:
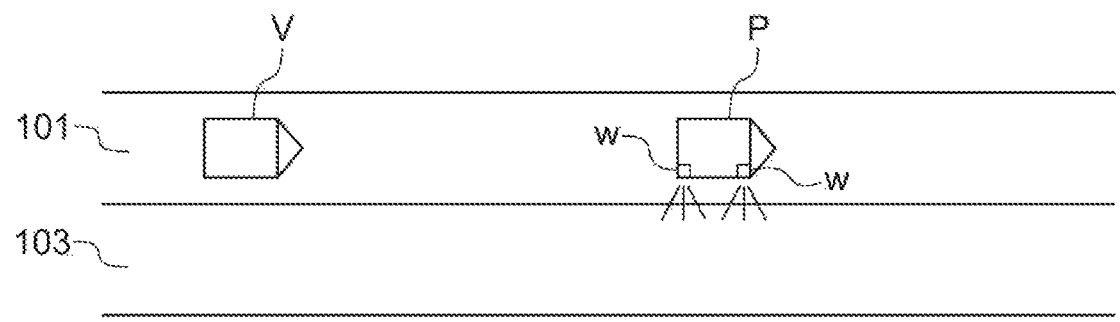
FIG. 22 is a diagram illustrating a situation in which a direction indicator of the preceding vehicle is turned on, and an adjacent lane to which the preceding vehicle can move in a direction indicated by the direction indicator is present.

As shown in FIGS. 21 and 22, the passing restraint determination unit 14c determines whether a direction indicator w of the preceding vehicle P is turned on (S707a). The passing restraint determination unit 14c determines which direction the direction indicator w of the preceding vehicle P indicates, in addition to the presence or absence of the turn-on of the direction indicator w. The passing restraint determination unit 14c can acquire information relating to the turn-on state of the direction indicator w of the preceding vehicle P through the preceding vehicle recognition unit 11 using the camera of the external sensor 1. In addition, the passing restraint determination unit 14c can recognize in which direction the preceding vehicle P plans to perform a lane change through the preceding vehicle recognition unit 11 using vehicle-to-vehicle communication with the preceding vehicle P. In the vehicle-to-vehicle communication, it is possible to recognize in which direction the preceding vehicle P plans to perform a lane change through a predetermined radio signal or a sound signal for notifying the surroundings of the lane change of the preceding vehicle P in advance.

When the direction indicator w of the preceding vehicle P is turned on (S707a), the passing restraint determination unit 14c determines whether the adjacent lane 103 to which the preceding vehicle P can move from the traveling lane 101 along which the host vehicle V and the preceding vehicle P travel in a direction indicated by the direction indicator w is present (S707b). The passing restraint determination unit 14c can recognize whether the adjacent lane 103 to which the preceding vehicle P can move is present, through the road information acquisition unit 12 using the external sensor 1, the GPS receiving unit 2 and the map database 4.

When an interval in which movement from the traveling lane 101 to the adjacent lane 103 can be made is present, for example, at a distance equal to or less than an arbitrary threshold from the preceding vehicle P, the passing restraint determination unit 14c can determine that the preceding vehicle P can move. The interval in which movement can be made means an interval in which movement from the traveling lane 101 to the adjacent lane 103 is not interfered with by the structure of a road or laws and ordinances. The interval in which movement is interfered with by the structure of a road means, for example, an interval in which the traveling lane 101 and the adjacent lane 103 are separated from each other by a wall, and an interval which is a separate road having the traveling lane 101 and the adjacent lane 103 separated from each other. In addition, the interval in which movement is interfered with by laws and ordinances equivalent to, for example, a case in which the traveling lane 101 and the adjacent lane 103 are demarcated by a yellow line indicating the prohibition of a lane change by laws and ordinances, a case in which a road sign for prohibiting a lane change is present, or the like.

When the direction indicator w of the preceding vehicle P is turned on (S707a), and the adjacent lane 103 to which the preceding vehicle P can move from the traveling lane 101 along which the host vehicle V and the preceding vehicle P travel in a direction indicated by the direction indicator w is present (S707b), the passing restraint determination unit 14c establishes the seventh determination flag (S707c). On the other hand, when the direction indicator w of the preceding vehicle P is not turned on (S707a), and the adjacent lane 103 to which the preceding vehicle P can move from the traveling lane 101 along which the host vehicle V and the preceding vehicle P travel in a direction indicated by the direction indicator w is not present (S707b), the passing restraint determination unit 14c does not establish the seventh determination flag (S707d).

Meanwhile, the process of S707b can allow the frequency of excessive restraint such as restraint of passing of the preceding vehicle P to be reduced when the direction indicator w of the preceding vehicle P indicates a direction in which a lane change cannot be performed in reality due to forgetting to turn off the indicator, or the like. However, the process is not necessarily requisite, and may be omitted.

In the example of the seventh determination process based on the processed of S707a to S707d, when the passing request flag is established with respect to the preceding vehicle P which is a target for the operation of passing in which the passing request flag is established by the passing request determination unit 13, and then it is predicted that, within a fixed period of time, the preceding vehicle P moves from the traveling lane 101 along which the host vehicle V and the preceding vehicle P travel to the adjacent lane 103, the passing restraint flag is established by establishing the seventh determination flag, and thus it is possible to reduce the occurrence of an inappropriate operation of passing which has the possibility of passing not being required. In addition, in the example of the seventh determination process based on the processes of S707a to S707d, since a lane change of the preceding vehicle P is predicted on the basis of the turn-on of the direction indicator w of the preceding vehicle P, it is possible to enhance the accuracy of prediction.

(Eighth Determination Process)

Hereinafter, the eighth determination process in S708 of FIG. 20 will be described. In the eighth determination process, when the passing request flag is established with respect to the preceding vehicle P which is a target for the operation of passing in which the passing request flag is established by the passing request determination unit 13, and then it is predicted that, within a fixed period of time, the preceding vehicle P moves from the traveling lane 101 along which the host vehicle V and the preceding vehicle P travel to the branching lane, the passing restraint flag is established by establishing the eighth determination flag.

Figure 23:
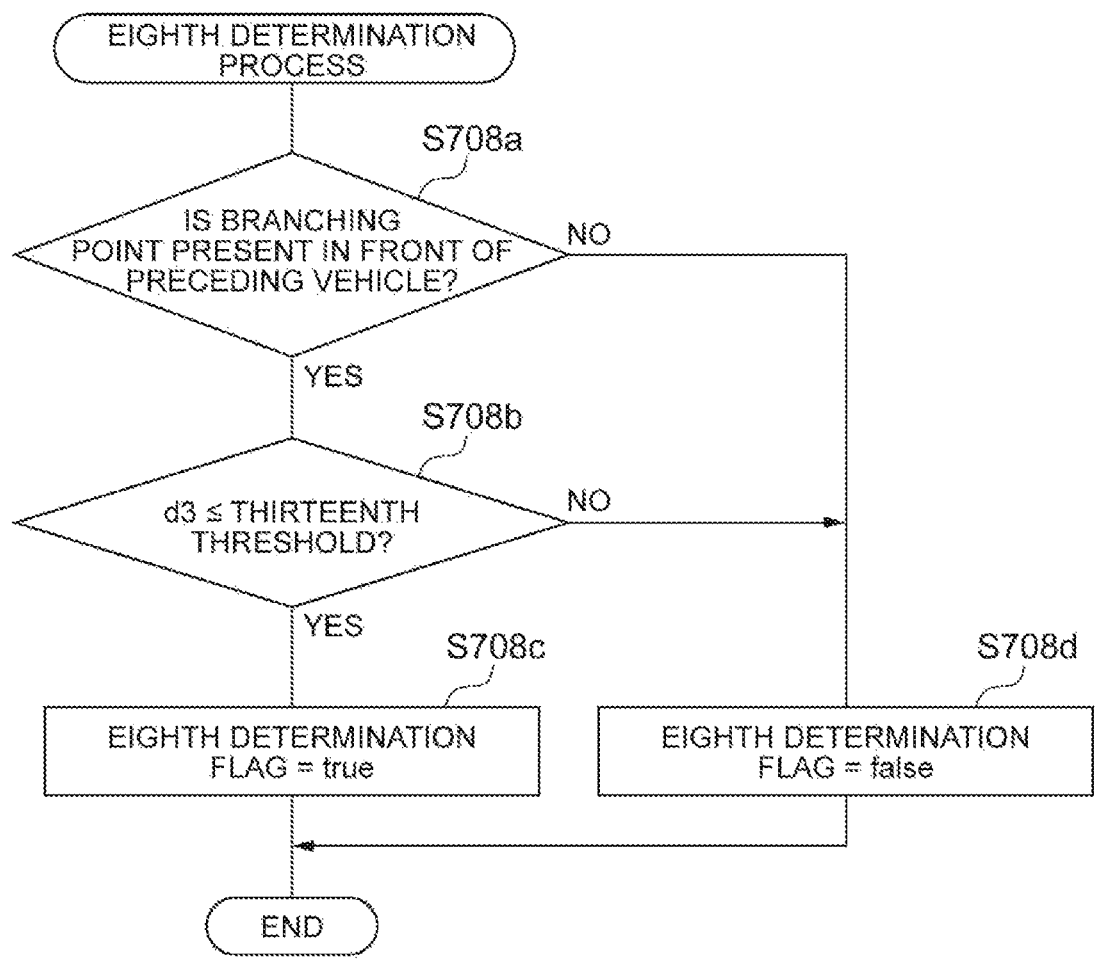
FIG. 23 is a flow diagram illustrating an example of an eighth determination process of FIG. 20.
Figure 24:
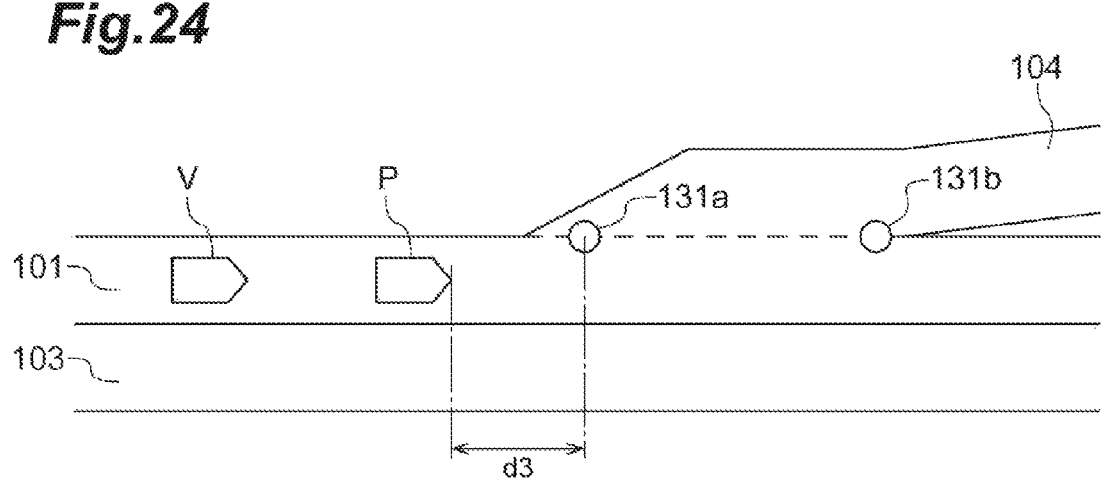
FIG. 24 is a diagram illustrating a situation in which a branching point between a branching lane branching from a traveling lane along which the preceding vehicle travels and the traveling lane is present in front of the preceding vehicle.

As shown in FIGS. 23 and 24, the passing restraint determination unit 14c determines whether branching points 131a and 131b between a branching lane 104 branching from the traveling lane 101 along which the host vehicle V and the preceding vehicle P travel and the traveling lane 101 are present in front of the preceding vehicle P (S708a). The branching lane 104 means a single or a plurality of lanes separately extending from the traveling lane 101 in a direction different from that of the traveling lane 101. A single or a plurality of other lanes may be present between the traveling lane 101 and the branching lane 104.

The branching point may be set to a position at the back by an arbitrary distance from the starting end of an interval in which movement from the traveling lane 101 to the branching lane 104 can be performed like the branching point 131a, may be set to a position of the terminating end of an interval in which movement from the traveling lane 101 to the branching lane 104 can be performed like the branching point 131b, and may set to an arbitrary position between the branching point 131a and the branching point 131b.

The passing restraint determination unit 14c can determine whether the branching points 131a and 131b are present in front of the preceding vehicle P through the road information acquisition unit 12 using the external sensor 1, the GPS receiving unit 2 and the map database 4.

When the branching points 131a and 131b are present in front of the preceding vehicle P (S708a), the passing restraint determination unit 14c determines whether a distance d3 between the position of the preceding vehicle P and the branching points 131a and 131b is equal to or less than a thirteenth threshold (S708b). The thirteenth threshold is a threshold for determining whether the preceding vehicle P can perform a lane change to the branching lane 104 in front of the branching points 131a and 131b.

Meanwhile, in the example of FIG. 24, the position of the preceding vehicle P is based on the front end of the preceding vehicle P, but the position of the preceding vehicle P may be based on the centroid of the preceding vehicle P or the front end of the preceding vehicle P.

In addition, in the example of FIG. 24, the distance d3 between the branching points 131a and 131b and the position of the preceding vehicle P is based on a distance in a straight line between the branching points 131a and 131b and the position of the preceding vehicle P, but the distance d3 may be based on a distance along the shapes of the traveling lane 101 and the branching lane 104 between the branching points 131a and 131b and the position of the preceding vehicle P. In addition, the distance d3 may be based on the distance of an interval in which a lane change between the branching points 131a and 131b and the position of the preceding vehicle P can be performed. For example, the interval in which a lane change between the branching points 131a and 131b and the position of the preceding vehicle P is equivalent to, for example, a case in which the traveling lane 101 and the branching lane 104 are demarcated by a yellow line indicating the prohibition of a lane change by laws and ordinances. In addition, the distance d3 may be calculated by the product of a time which is taken until the preceding vehicle P reaches the branching points 131a and 131b, and the speed of the preceding vehicle P or the speed of the host vehicle V.

When the branching points 131a and 131b are present in front of the preceding vehicle P (S708a), and the distance d3 between the position of the preceding vehicle P and the branching points 131a and 131b is equal to or less than the thirteenth threshold (S708b), the passing restraint determination unit 14c establishes the eighth determination flag (S707c). On the other hand, when the branching points 131a and 131b are not present in front of the preceding vehicle P (S708a), and the distance d3 between the position of the preceding vehicle P and the branching points 131a and 131b exceeds the thirteenth threshold (S708b), the passing restraint determination unit 14c does not establish the eighth determination flag (S708d).

Meanwhile, the thirteenth threshold may be set to 0, and may be set so that the eighth determination flag is established when the preceding vehicle P reaches the branching points 131a and 131b. In addition, as the number of other lanes which are present between the traveling lane 101 and the branching lane 104 becomes larger, the thirteenth threshold may be set to have a larger value. In addition, as the maximum speed, stipulated by laws and ordinances, of the traveling lane 101 or the branching lane 104 becomes higher, the thirteenth threshold may be set to have a larger value. In addition, as the number of lanes of a road including the traveling lane 101 or the branching lane 104 becomes larger, the thirteenth threshold may be set to have a larger value.

In the example of the eighth determination process based on the processes of S708a to S708d, when the passing request flag is established with respect to the preceding vehicle P which is a target for the operation of passing in which the passing request flag is established by the passing request determination unit 13, and then it is predicted that, within a fixed period of time, the preceding vehicle P moves from the traveling lane 101 along which the host vehicle V and the preceding vehicle P travel to the branching lane 104, the passing restraint flag is established by establishing the eighth determination flag, and thus it is possible to reduce the occurrence of an inappropriate operation of passing which has the possibility of passing not being required.

In addition, in the example of the eighth determination process based on the processes of S708a to S708d, it is possible to reduce the occurrence of an inappropriate operation of passing which has the possibility of passing not being required with respect to the preceding vehicle P that performs a lane change without turning on the direction indicator w. Incidentally, since the turn-on of the direction indicator w is normally performed a few seconds before a lane change, and the operation of passing normally requires a dozen of seconds. Therefore, when the operation of passing is restrained on the basis of only the turn-on of the direction indicator w, the preceding vehicle P may perform a lane change halfway through the operation of passing. However, in the example of the eighth determination process based on the processes of S708a to S708d, it is possible to predict a lane change of the preceding vehicle P at the stage a few seconds to several tens of seconds before the lane change, and to reduce the occurrence of an inappropriate operation of passing which has the possibility of passing not being required.

Hereinafter, another example of the eighth determination process will be described. In the eighth determination process of this example, in the process of S708b, a single or a plurality of processes shown below are further performed. First, in the process of S708b, when the distance d3 between the position of the preceding vehicle P and the branching points 131a and 131b is equal to or less than the thirteenth threshold, and the absolute value of a difference between the speed of the preceding vehicle P and the maximum speed, stipulated by laws and ordinances, of the branching lane 104 is equal to or less than an arbitrary threshold, the passing restraint determination unit 14c may establish the eighth determination flag. The arbitrary threshold may be set to have a larger value as the difference between the maximum speed of the traveling lane 101 and the maximum speed of the branching lane 104 becomes larger. In addition, the arbitrary threshold may be set on the basis of the maximum speed of the traveling lane 101 and the maximum speed of the branching lane 104. In addition, the arbitrary threshold may be set on the basis of statistical data or an information process of the behavior of other vehicles in the branching points 131a and 131b.

In addition, in the process of S708b, when the distance d3 between the position of the preceding vehicle P and the branching points 131a and 131b is equal to or less than the thirteenth threshold, the passing restraint determination unit 14c may establish the eighth determination flag in any of a case in which the preceding vehicle P is decelerating, and a case in which the acceleration of the preceding vehicle P is equal to or less than an arbitrary threshold. It can be determined from a history of the speed of the preceding vehicle P that the preceding vehicle P is decelerating. For example, when the preceding vehicle P has performed deceleration before a time equal to or less than an arbitrary threshold, it is possible to determine that the preceding vehicle P is decelerating.

In addition, in the process of S708b, the preceding vehicle P is biased on the branching lane 104 side when the distance d3 between the position of the preceding vehicle P and the branching points 131a and 131 b is equal to or less than the thirteenth threshold, and the passing restraint determination unit 14c may establish the eighth determination flag when a distance from a central line along the traveling direction of the traveling lane 101 to the position of the preceding vehicle P is equal to or greater than an arbitrary threshold. In addition, in the process of S708b, the passing restraint determination unit 14c may establish the eighth determination flag when the distance d3 between the position of the preceding vehicle P and the branching points 131a and 131b is equal to or less than the thirteenth threshold, and a distance from the end of the road on the branching lane side of the traveling lane 101 to the position of the preceding vehicle P is equal to or less than an arbitrary threshold. Alternatively, in the process of S708b, the passing restraint determination unit 14c may establish the eighth determination flag when the distance d3 between the position of the preceding vehicle P and the branching points 131a and 131b is equal to or less than the thirteenth threshold, and a distance from the end of the road on the opposite side to the branching lane of the traveling lane 101 to the position of the preceding vehicle P is equal to or greater than an arbitrary threshold.

In addition, in the process of S708b, the passing restraint determination unit 14c may establish the eighth determination flag when the distance d3 between the position of the preceding vehicle P and the branching points 131a and 131b is equal to or less than the thirteenth threshold, and the lateral acceleration of a direction from the center of the traveling lane of the preceding vehicle P to the end of the road is equal to or greater than an arbitrary threshold. Meanwhile, each arbitrary threshold in another example of the eighth determination process described above may be set using machine learning or a physical model.

In another example of the eighth determination process, it is possible to reduce the frequency of excessive restraint such as restraint of passing with respect to the preceding vehicle P which does not perform a lane change to the branching lane 104 in reality. In another example of the eighth determination process, when the eighth determination flag is established, it is possible to enhance the probability of the preceding vehicle P performing a lane change in reality.

According to the third embodiment, the passing restraint determination unit 14c establishes the passing restraint flag when there is the possibility of passing not being required such as when the direction indicator w of the preceding vehicle P is turned on, and there is the adjacent lane 103 to which the preceding vehicle P can move from the traveling lane 101 along which the host vehicle V and the preceding vehicle P travel in a direction indicated by the direction indicator w. Thereby, it is possible to reduce the occurrence of an inappropriate operation of passing which has the possibility of passing not being required.

That is, when the preceding vehicle P moves to a separate lane from the traveling lane 101 along which the preceding vehicle P travels during the operation of passing, the operation of passing is not required, an unnecessary lane change or the like is performed by an occupant of the host vehicle V, and thus the occupant of the host vehicle V feels inconvenience. Consequently, in the third embodiment, it is possible to eliminate the occurrence of a sense of discomfort of causing an occupant to perform an unnecessary lane change or the like.

Meanwhile, in the first determination process (S701) to the fifth determination process (S705) of FIG. 20, all of the first determination process (S701) to the fifth determination process (S705) are not necessarily performed. In addition, in the seventh determination process (S707) and the eighth determination process (S708) of FIG. 20, all of the seventh determination process (S707) and the eighth determination process (S708) are not necessarily performed. A single and a plurality of processes selected from the first determination process (S701) to the fifth determination process (S705) and at least any of the processes of the seventh determination process (S707) and the eighth determination process (S708) may be performed in combination thereof. In this case, the preceding vehicle recognition unit 11 and the road information acquisition unit 12 does not need to acquire information for processes which are not performed, and the information for processes which are not performed does not need to be stored in the map database 4.

Fourth Embodiment

Figure 25:
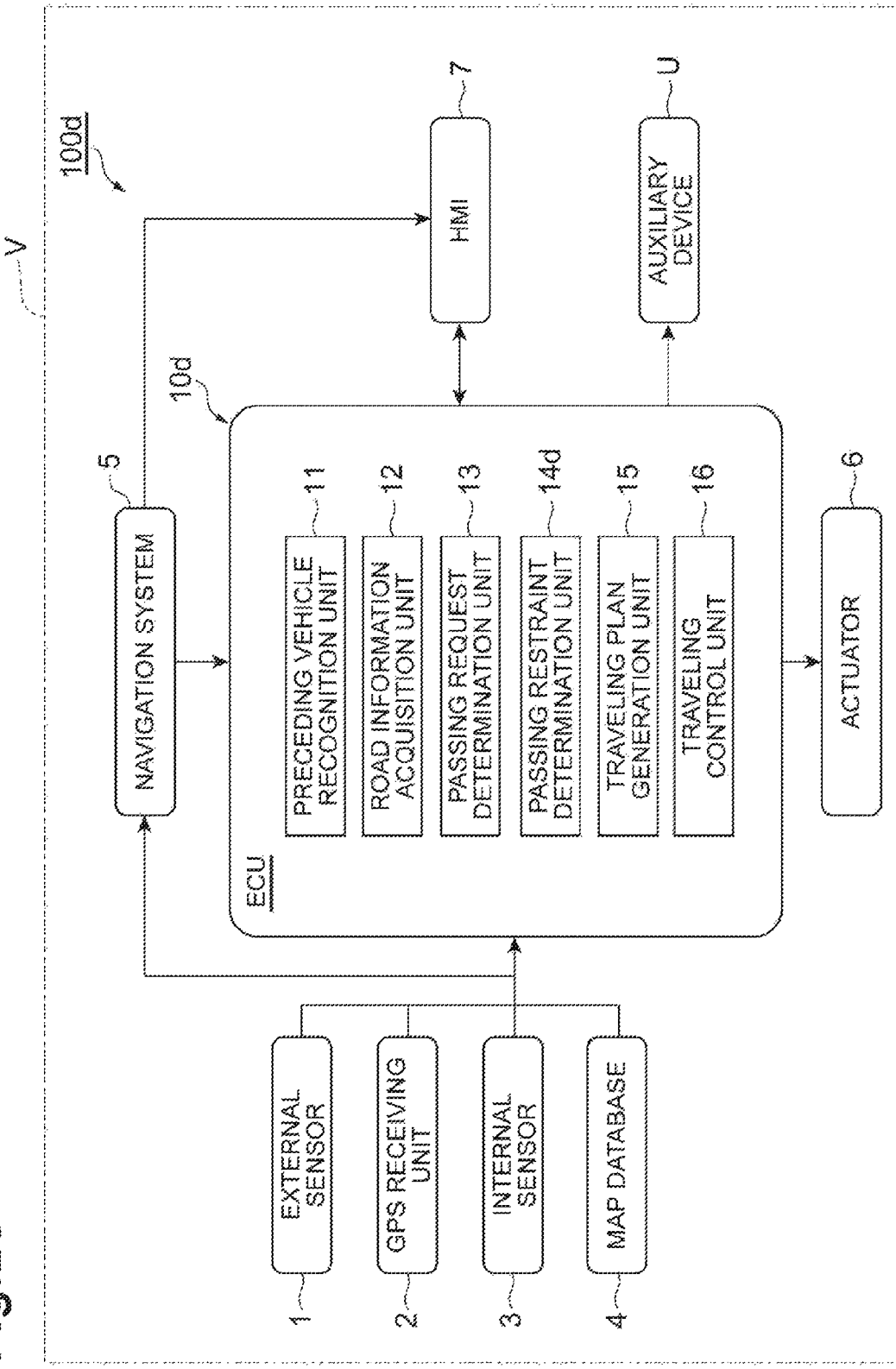
FIG. 25 is a block diagram illustrating a configuration of a vehicle control device according to a fourth embodiment.
Figure 26:
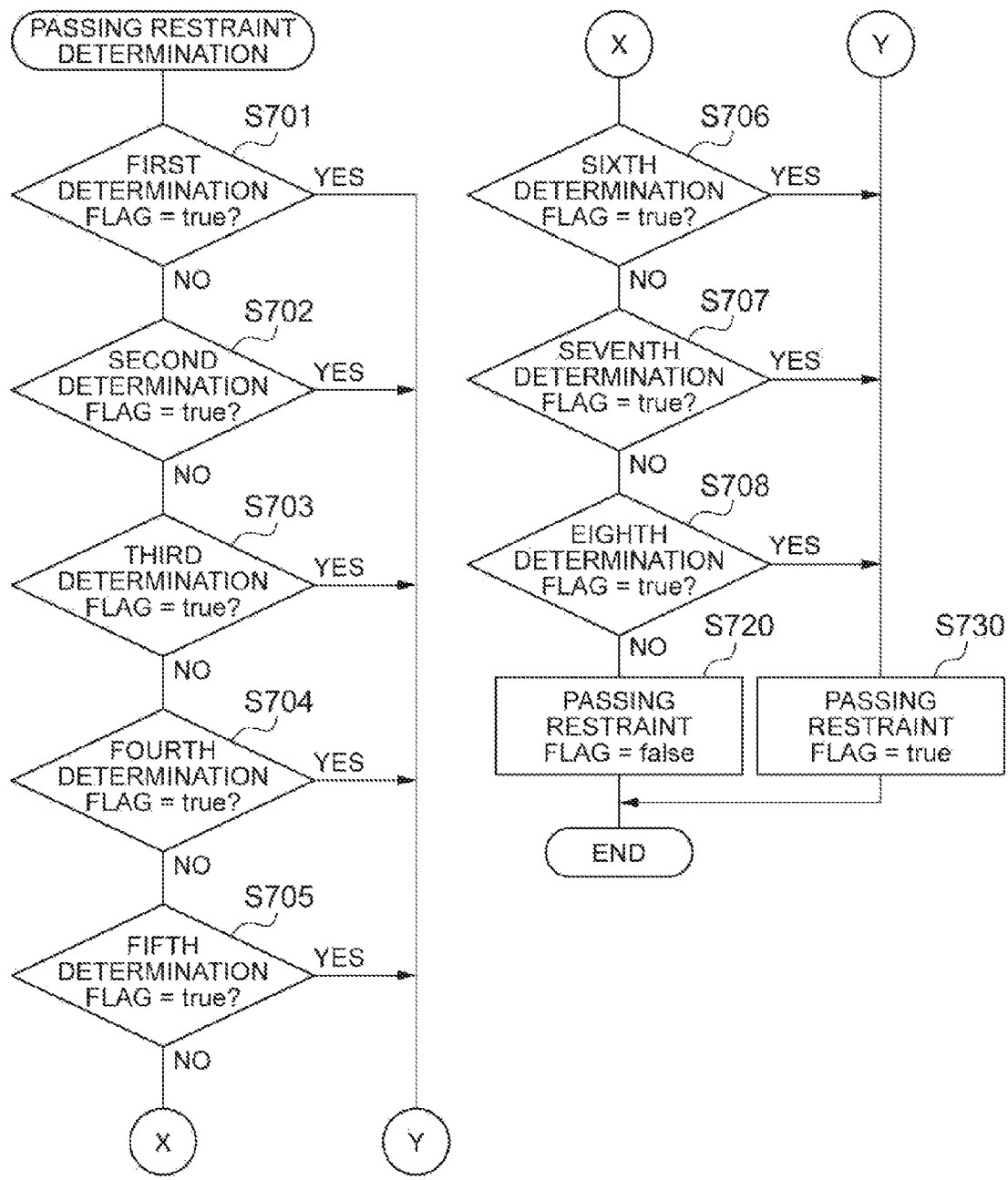
FIG. 26 is a flow diagram illustrating a passing restraint determination process in the fourth embodiment of FIG. 2.

Hereinafter, a fourth embodiment of the present invention will be described. As shown in FIG. 25, a vehicle control device 100d of the present embodiment includes an ECU 10d instead of the ECU 10a of first embodiment. The ECU 10d includes a passing restraint determination unit 14d instead of the passing restraint determination unit 14a of first embodiment. As shown in FIG. 26, in the passing restraint determination process in S7 of FIG. 2, the passing restraint determination unit 14d of the present embodiment performs the first determination process (S701) to the eighth determination process (S708). When the first determination flag is not established in the first determination process (S701), the second determination flag is not established in the second determination process (S702), the third determination flag is not established in the third determination process (S703), the fourth determination flag is not established in the fourth determination process (S704), the fifth determination flag is not established in the fifth determination process (S705), the sixth determination flag is not established in the sixth determination process (S706), the seventh determination flag is not established in the seventh determination process (S707), and the eighth determination flag is not established in the eighth determination process (S708), the passing restraint determination unit 14d does not establish the passing restraint flag (S720).

On the other hand, when the first determination flag is established in the first determination process (S701), the second determination flag is established in the second determination process (S702), the third determination flag is established in the third determination process (S703), the fourth determination flag is established in the fourth determination process (S704), the fifth determination flag is established in the fifth determination process (S705), the sixth determination flag is established in the sixth determination process (S706), the seventh determination flag is established in the seventh determination process (S707), and the eighth determination flag is established in the eighth determination process (S708), the passing restraint determination unit 14d establishes the passing restraint flag (S730).

Meanwhile, in the first determination process (S701) to the fifth determination process (S705) of FIG. 26, all of the first determination process (S701) to the fifth determination process (S705) are not necessarily performed. In addition, in the seventh determination process (S707) and the eighth determination process (S708) of FIG. 26, all of the seventh determination process (S707) and the eighth determination process (S708) are not necessarily performed. A single and a plurality of processes selected from the first determination process (S701) to the fifth determination process (S705), at least any of the processes of the seventh determination process (S707) and the eighth determination process (S708), and the sixth determination process (S706) may be performed in combination thereof. In this case, the preceding vehicle recognition unit 11 and the road information acquisition unit 12 does not need to acquire information for processes which are not performed, and the information for processes which are not performed does not need to be stored in the map database 4.

As stated above, the embodiments of the present invention have been described, but the present invention is embodied in various forms without being limited to the aforementioned embodiments.

What is claimed is:

1. A vehicle control device comprising:
a preceding vehicle recognition unit configured to recognize a preceding vehicle traveling in front of a host vehicle;
a road information acquisition unit configured to acquire road information relating to a traveling lane along which the host vehicle and the preceding vehicle travel;
a passing request determination unit configured to establish a passing request flag for requesting that the host vehicle pass the preceding vehicle ahead, when an inter-vehicle distance between the preceding vehicle recognized by the preceding vehicle recognition unit and the host vehicle is equal to or less than a first threshold, and a relative speed between the preceding vehicle and the host vehicle when the host vehicle comes close to the preceding vehicle recognized by the preceding vehicle recognition unit is equal to or greater than a second threshold;
a passing restraint determination unit configured to establish a passing restraint flag for restraining the host vehicle from passing the preceding vehicle ahead, on the basis of any of a state of the preceding vehicle recognized by the preceding vehicle recognition unit and the road information acquired by the road information acquisition unit;
a traveling plan generation unit configured to generate a traveling plan of the host vehicle on the basis of the state of the preceding vehicle recognized by the preceding vehicle recognition unit, the road information acquired by the road information acquisition unit, the passing request flag established by the passing request determination unit, and the passing restraint flag established by the passing restraint determination unit; and
a traveling control unit configured to control traveling of the host vehicle so that the host vehicle travels in accordance with the traveling plan generated by the traveling plan generation unit,
wherein the traveling plan generation unit is configured to generate a traveling plan for the host vehicle to pass the preceding vehicle ahead when the passing request flag is established and the passing restraint flag is not established, and to generate a traveling plan for the host vehicle not to pass the preceding vehicle ahead when the passing request flag is not established and the passing restraint flag is established, and
the passing restraint determination unit is configured to establish the passing restraint flag in any of the following cases:
a case in which a distance between a merging point of the traveling lane along which the host vehicle and the preceding vehicle travel and a merging lane merging into the traveling lane, and a position of the preceding vehicle having passed through the merging point is equal to or less than a third threshold;
a case in which the preceding vehicle travels along the merging lane and then moves to the traveling lane along which the host vehicle travels, and a time elapsed after the preceding vehicle has moved to the traveling lane is equal to or less than a fourth threshold;
a case in which a distance between a maximum speed increase point at which a maximum speed, stipulated by laws and ordinances, of the traveling lane along which the host vehicle and the preceding vehicle travel increases and a position of the preceding vehicle having passed through the maximum speed increase point is equal to or less than a fifth threshold;
a case in which the distance between the maximum speed increase point and the position of the preceding vehicle having passed through the maximum speed increase point is equal to or less than the fifth threshold, and a difference between a speed of the preceding vehicle having passed through the maximum speed increase point and the maximum speed before increase at the maximum speed increase point is equal to or less than a sixth threshold;
a case in which the distance between the maximum speed increase point and the position of the preceding vehicle having passed through the maximum speed increase point is equal to or less than the fifth threshold, and a difference between the speed of the preceding vehicle having passed through the maximum speed increase point and the maximum speed after increase at the maximum speed increase point is equal to or greater than a seventh threshold;

a case in which a time for which a state where the speed of the preceding vehicle is equal to or less than an eighth threshold continues is equal to or greater than a ninth threshold;

a case in which a time elapsed after a state where the speed of the preceding vehicle exceeds the eighth threshold from a state where the time for which a state where the speed of the preceding vehicle is equal to or less than the eighth threshold continues is equal to or greater than the ninth threshold is equal to or less than a tenth threshold;

a case in which the traveling plan generation unit generates the traveling plan to decelerate the host vehicle; and a case in which, when the traveling plan generation unit generates the traveling plan to decelerate the host vehicle, a predicted relative speed between the preceding vehicle when the host vehicle comes close to the preceding vehicle and the host vehicle after deceleration based on the traveling plan is less than the second threshold.

2. The vehicle control device according to claim 1, wherein the passing restraint determination unit is configured to establish the passing restraint flag when the inter-vehicle distance between the preceding vehicle and the host vehicle is equal to or less than an eleventh threshold, and an absolute value of deceleration of the preceding vehicle is equal to or greater than a twelfth threshold.

3. The vehicle control device according to claim 2, wherein the passing restraint determination unit is configured to establish the passing restraint flag in any of the following cases:

a case in which a direction indicator of the preceding vehicle is turned on, and there is an adjacent lane to which the preceding vehicle is capable of moving from the traveling lane along which the host vehicle and the preceding vehicle travel in a direction indicated by the direction indicator; and a case in which a branching point between a branching lane branching from the traveling lane along which the host vehicle and the preceding vehicle travel and the traveling lane is present in front of the preceding vehicle, and a distance between the position of the preceding vehicle and the branching point is equal to or less than a thirteenth threshold.

4. The vehicle control device according to claim 1, wherein the passing restraint determination unit is configured to establish the passing restraint flag in any of the following cases:

a case in which a direction indicator of the preceding vehicle is turned on, and there is an adjacent lane to which the preceding vehicle is capable of moving from the traveling lane along which the host vehicle and the preceding vehicle travel in a direction indicated by the direction indicator; and a case in which a branching point between a branching lane branching from the traveling lane along which the host vehicle and the preceding vehicle travel and the traveling lane is present in front of the preceding vehicle, and a distance between the position of the preceding vehicle and the branching point is equal to or less than a thirteenth threshold.

* * * * *